(12) United States Patent
Tamaki et al.

(10) Patent No.: US 11,900,190 B2
(45) Date of Patent: Feb. 13, 2024

(54) PRETREATMENT CONTROL APPARATUS FOR PRETREATMENT DEVICE, PRETREATMENT CONTROL METHOD FOR PRETREATMENT DEVICE, AND NON-TRANSITORY COMPUTER-READABLE MEDIUM STORING COMPUTER-READABLE INSTRUCTIONS FOR PRETREATMENT CONTROL APPARATUS

(71) Applicant: BROTHER KOGYO KABUSHIKI KAISHA, Nagoya (JP)

(72) Inventors: Shuichi Tamaki, Nagoya (JP); Takeshi Watanabe, Nagoya (JP); Kenji Sato, Yokkaichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/141,424

(22) Filed: Sep. 25, 2018

(65) Prior Publication Data

US 2019/0303734 A1 Oct. 3, 2019

(30) Foreign Application Priority Data

Mar. 30, 2018 (JP) .................. 2018-070396

(51) Int. Cl.
*G06K 15/00* (2006.01)
*G06K 15/02* (2006.01)
(Continued)

(52) U.S. Cl.
CPC ........ *G06K 15/4065* (2013.01); *B41J 3/4078* (2013.01); *B41J 11/009* (2013.01);
(Continued)

(58) Field of Classification Search
None
See application file for complete search history.

(56) References Cited

U.S. PATENT DOCUMENTS

2006/0023230 A1* 2/2006 Nakata .................. G06F 3/1255
358/1.6
2006/0214984 A1* 9/2006 Hirakawa ................ B41J 13/03
347/31

(Continued)

FOREIGN PATENT DOCUMENTS

JP 2008006734 A 1/2008
JP 2013-019083 A 1/2013

OTHER PUBLICATIONS

Extended European Search Report issued in connection with European Application No. 18196647.4, dated Apr. 8, 2019. (5 pages).

(Continued)

*Primary Examiner* — Miya J Cato
*Assistant Examiner* — Pawan Dhingra
(74) *Attorney, Agent, or Firm* — K&L Gates LLP

(57) ABSTRACT

An acquisition portion of a pretreatment control apparatus acquires identification information capable of identifying a treatment medium (step S1). A first transmission portion transmits a pretreatment instruction based on the identification information to a pretreatment device which performs a pretreatment with respect to the treatment medium (step S13). A second transmission portion transmits a transmission instruction for identified print data based on the identification information, to a storage device which stores print data (step S3). As a result, the pretreatment control apparatus can transmit the pretreatment instruction and the identified print data by acquiring a single piece of identification information. Therefore, the number of processing steps by the pretreatment control apparatus is fewer than when the (Continued)

pretreatment instruction and the identified print data are transmitted by acquiring different information.

7 Claims, 19 Drawing Sheets

(51) Int. Cl.
    *B41J 11/00*     (2006.01)
    *B41J 3/407*     (2006.01)

(52) U.S. Cl.
    CPC ......... *B41J 11/0015* (2013.01); *G06K 15/005* (2013.01); *G06K 15/021* (2013.01); *G06K 2215/0097* (2013.01)

(56) References Cited

U.S. PATENT DOCUMENTS

| | | | | |
|---|---|---|---|---|
| 2008/0001983 A1* | 1/2008 | Kawakami | ............... | B41J 29/38 347/14 |
| 2013/0265359 A1* | 10/2013 | Sugaya | .................. | B41J 13/223 347/16 |
| 2013/0335467 A1* | 12/2013 | Gerber | ..................... | B41J 11/20 347/8 |
| 2016/0307078 A1* | 10/2016 | Akazawa | ........... | G06K 15/1823 |

OTHER PUBLICATIONS

Communication pursuant to Article 94(3) EPC dated Jul. 20, 2020 in corresponding European Patent Application No. 18196647.4.
Japanese Office Action dated Oct. 5, 2021 in corresponding Japanese application No. 2018-070396 (11 pages).
Japanese Office Action issued in corresponding Japanese Patent Application No. 2018-070396, dated May 10, 2022 (5 pages).
European Office Action dated Feb. 17, 2022, in corresponding European Patent Application No. 18196647.4 (5 pages).

* cited by examiner

FIG. 6

| | | | | | |
|---|---|---|---|---|---|
| | IDENTIFICATION INFORMATION | ID1 | ID2 | ID3 | ··· |
| APPLICATION TREATMENT INFORMATION | APPLICATION AMOUNT PER UNIT AREA (mg / cm$^2$) | C1 | — | C3 | ··· |
| | APPLICATION RANGE | CR1 | — | CR3 | ··· |
| | TYPE OF PRETREATMENT AGENT | L1 | — | L3 | ··· |
| HEAT TREATMENT INFORMATION | HEAT TREATMENT PRESSURE (N / cm$^2$) | P1 | P2 | P3 | ··· |
| | HEAT TREATMENT TIME PERIOD (sec) | T1 | T2 | T3 | ··· |
| | HEAT TREATMENT TEMPERATURE (C) | TP1 | TP2 | TP3 | ··· |
| | HEAT TREATMENT RANGE | PR1 | PR2 | PR3 | ··· |
| | NUMBER OF HEAT TREATMENTS | NT1 | NT2 | NT3 | ··· |

| SPRAY | (1) | (2) | (3) | (4) | (5) | (6) | (7) |
|---|---|---|---|---|---|---|---|
| APPLICATION SECTION | [0, a] | [a, b] | [b, c] | [c, d] | [d, e] | [e, f] | [f, g] |

PRETREATMENT CONTROL APPARATUS FOR PRETREATMENT DEVICE, PRETREATMENT CONTROL METHOD FOR PRETREATMENT DEVICE, AND NON-TRANSITORY COMPUTER-READABLE MEDIUM STORING COMPUTER-READABLE INSTRUCTIONS FOR PRETREATMENT CONTROL APPARATUS

This application claims priority to Japanese Patent Application No. 2018-70396 filed Mar. 30, 2018. The contents of the foregoing application are hereby incorporated herein by reference.

BACKGROUND

The present disclosure relates to a pretreatment control apparatus, a pretreatment control method, and a non-transitory computer-readable medium.

An inkjet textile printing apparatus that performs a pretreatment before printing processing is known. This inkjet textile printing apparatus includes a textile printing execution portion and a pretreatment portion. The pretreatment portion performs processing to smooth out wrinkles in textile material to be printed, prior to discharging ink toward the textile material to be printed by the textile printing execution portion. Also, the pretreatment portion also performs other processing such as application solution adhesion processing to the textile material to be printed.

SUMMARY

When a printing apparatus performs printing processing, there are cases where the printing apparatus performs printing after acquiring print data for a print image from a server or the like, for example. In this case, an instruction to acquire the print data is input to the printing apparatus via an operation portion. That is, acquisition processing to acquire a pretreatment instruction in the pretreatment device and acquisition processing to acquire print data in the printing apparatus are performed separately, so the number of processing steps is large.

Embodiments of the broad principles derived herein provide a pretreatment control apparatus, a pretreatment control method, and a non-transitory computer-readable medium capable of reducing the number of processing steps.

The embodiments herein provide a pretreatment control apparatus including an acquisition portion which acquires identification information capable of identifying a treatment medium; a first transmission portion which transmits a pretreatment instruction based on the identification information acquired by the acquisition portion, to a pretreatment portion which performs a pretreatment with respect to the treatment medium; and a second transmission portion which transmits a transmission instruction for transmit identified print data based on the identification information, to a storage device which stores print data.

BRIEF DESCRIPTION OF THE DRAWINGS

Embodiments will be described below in detail with reference to the accompanying drawings in which:

FIG. 6 is a view showing an example of a first table 81;

FIG. 7 is a view showing an example of a second table 82;

DETAILED DESCRIPTION

A pretreatment control apparatus of each embodiment of the present invention will now be described with reference to the drawings.

First Embodiment

The pretreatment control apparatus of a first embodiment is a printing apparatus 1. A storage device that stores print data in the first embodiment is a Hard Disc Drive (HDD) 64 of a server 3. The printing apparatus 1 acquires identification information capable of identifying a treatment medium such as cloth via a code reader 35, and acquires a pretreatment instruction based on the identification information from a first table 81. The printing apparatus 1 transmits a transmission instruction that includes the identification information to the server 3 that has the HDD 64 that stores print data, and transmits the acquired pretreatment instruction to a pretreatment device 10 that executes a pretreatment with respect to the treatment medium. That is, the printing apparatus 1 transmits the pretreatment instruction acquired based on the identification information. Therefore, the printing apparatus 1 transmits the pretreatment instruction based on the identification information to the pretreatment device 10 that executes pretreatment with respect to the treatment medium.

Examples of the material of the cloth are cotton, polyester, and a blend of cotton and polyester or the like. As described above, the identification information is information capable of identifying the treatment medium, and is information capable of identifying print data and the pretreatment instruction corresponding to the treatment medium. The pretreatment instruction is information indicating the conditions of pretreatment with respect to the treatment medium, and includes application treatment information and heat treatment information.

The application treatment information is information indicating the conditions for application treatment with a pretreatment agent with respect to the treatment medium. The pretreatment agent is functional ink for improving the fixing of colored ink discharged onto the treatment medium. One example of the pretreatment agent is an aqueous solution containing metallic salt such as $CaCl_2$. The heat treatment information is information indicating the conditions for heat treatment with respect to the treatment medium. The transmission instruction is information instructing the transmission of print data corresponding to the identification information. The print data is information for the printing apparatus 1 to perform printing on the treatment medium.

System Configuration

Figure 1:
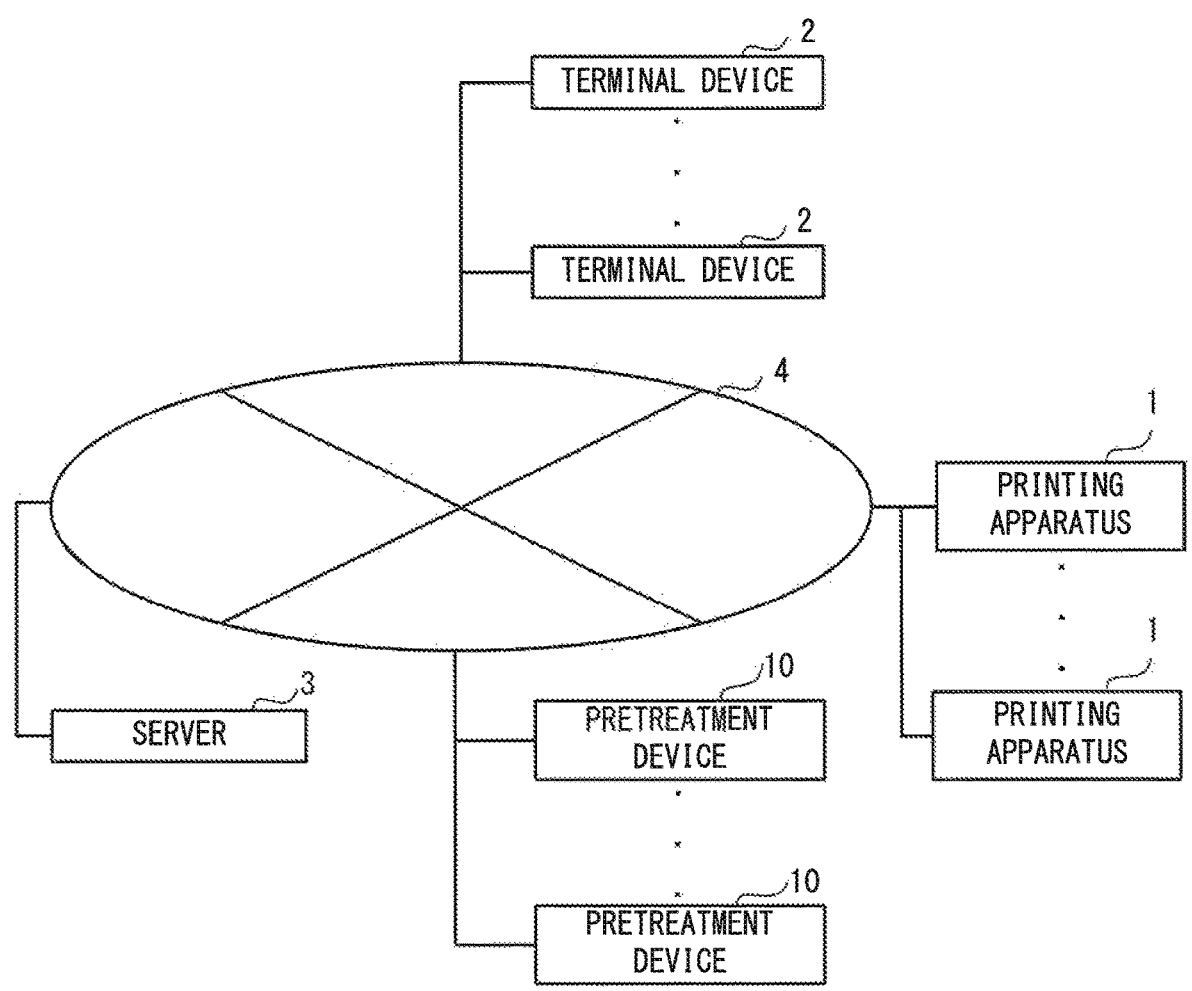
FIG. 1 is a view showing an example of a network configuration of a system that includes a printing apparatus 1.

As shown in FIG. 1, one or a plurality of the printing apparatuses 1, one or a plurality of the terminal devices 2, one or a plurality of the pretreatment devices 10, and the server 3 are connected together via a network 4. Examples of the network 4 include an intranet and the Internet and the like. Also, one or a plurality of the printing apparatuses 1, one or a plurality of the terminal devices 2, one or a plurality of the pretreatment devices 10, and the server 3 may each be connected via a serial cable that can be connected to a serial port such as a USB. Further, there may be both connection via the network 4 and connection via the serial cable.

Pretreatment Device 10

The pretreatment device 10 includes a platen (not shown in the drawings), an application portion 18 (refer FIG. 2), and a heat treatment portion 50 (refer to FIG. 2), and the like. The platen places the treatment medium. The platen is conveyed to the application portion 18 and the heat treatment portion 50 by a platen conveyance mechanism (not shown in the drawings) that includes a platen motor 17 (refer to FIG. 2), and the like. The platen has a generally rectangular shape with an upper surface that is long in the conveying direction. The platen motor 17 is a stepping motor, for example. The application portion 18 includes a plurality of sprays (not shown in the drawings), and applies the pretreatment agent to the treatment medium by the sprays spraying the pretreatment agent. The heat treatment portion 50 improves the fixing of the pretreatment agent to the treatment medium, and thus improves the image quality, by pressing the treatment medium at a high temperature to dry the pretreatment agent.

Electrical Configuration of Pretreatment Device 10

Figure 2:
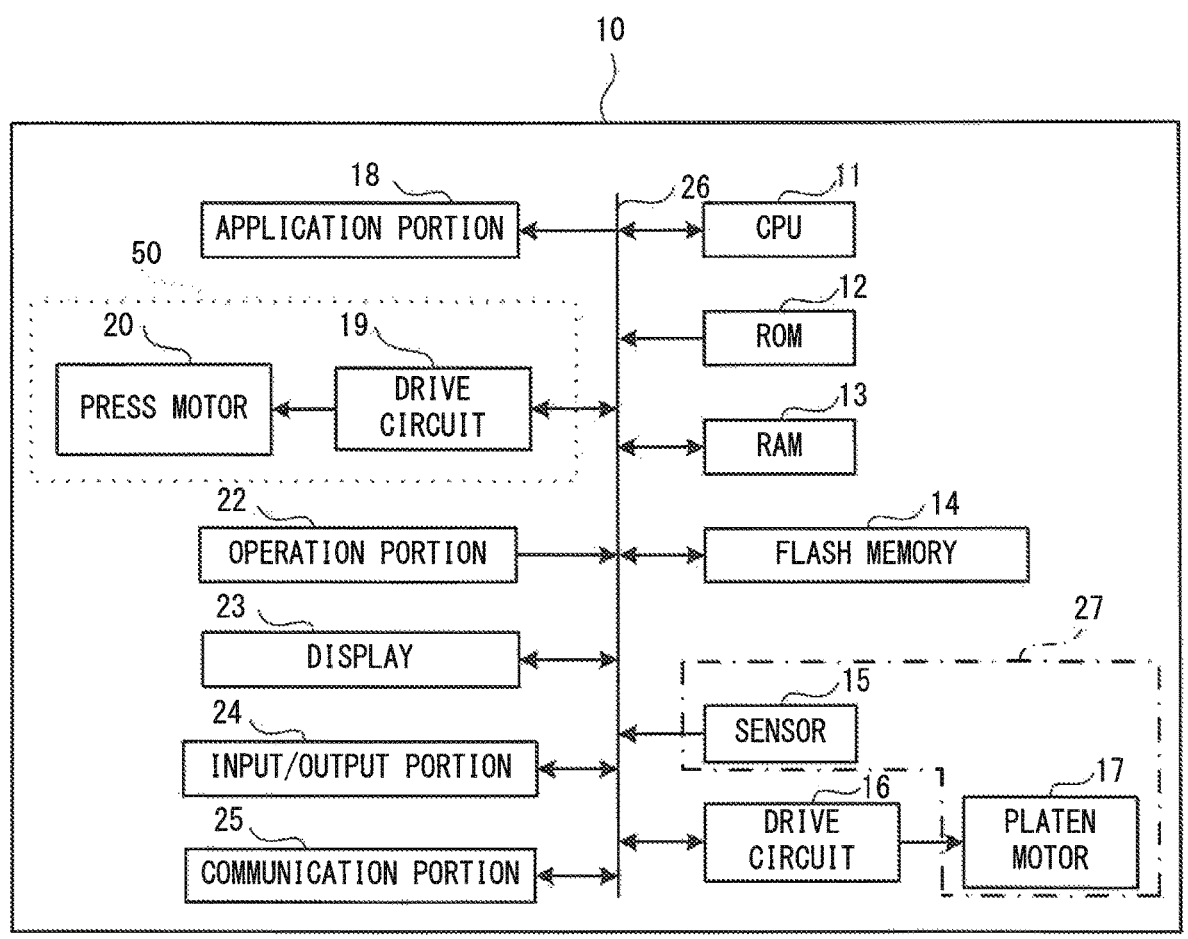
FIG. 2 is a block diagram showing a first example of the general electrical configuration of a pretreatment device 10.

As shown in FIG. 2, the pretreatment device 10 includes a CPU 11, ROM 12, RAM 13, flash memory 14, a sensor 15, drive circuits 16 and 19, the application portion 18, an operation portion 22, a display 23, an input/output portion 24, and a communication portion 25, and the like. Each configuration of the pretreatment device 10 is connected together via a bus 26. The CPU 11 controls the pretreatment device 10, and reads various programs from the ROM 12 and executes various processing using the RAM 13 as working memory.

The flash memory 14 stores various tables such as a second table 82, as well as various parameters and the like. The table is one example of corresponding information, and in the present embodiment, a table is described as an example, but the mode of the corresponding information is arbitrary. Also, the flash memory 14 stores the step number of the platen motor 17, the heat treatment position, and the application start position at each Y coordinate of the platen in association with each other.

The Y-axis of the platen is parallel to the conveying direction of the platen. That is, the Y-axis of the platen is parallel to the long direction of the platen. The X-axis of the platen is parallel to a direction that is both horizontal and orthogonal to the conveying direction of the platen. That is, the X-axis of the platen is parallel to the short direction of the platen.

The sensor 15 is a position detecting sensor such as a transmission sensor and is arranged in a position where it can detect the set position of the platen. As long as the sensor 15 can detect the set position, either a mechanical type- or an optical type-position detecting sensor can be used. The set position is the position where the treatment medium is placed on the platen.

The drive circuit 16 is connected to the platen motor 17 and drives the platen motor 17 under the control of the CPU 11. The drive circuit 19 is connected to a press motor 20 and drives the press motor 20 under the control of the CPU 11. In the present embodiment, the sensor 15 and the platen motor 17 in combination form a detection portion 27. In the present embodiment, the platen motor 17 is a stepping motor, as described above. The flash memory 14 stores the step number of the platen motor 17, the heat treatment position, and the application start position at each Y coordinate of the platen in association with each other. Therefore, the detection portion 27 can detect both the application start position at each Y coordinate of the platen and the heat treatment position by the step number from the set position. Also, the detection portion 27 can detect an application end position of an application range.

The operation portion 22 includes an operating panel and the like. The operating panel has buttons or the like. Therefore, an operator can give a desired instruction to the pretreatment device 10 via the operation portion 22. The display 23 is formed by a well-known display device or the like. The display 23 may also include a touch panel (not shown in the drawings) and function as the operation portion 22. The input/output portion 24 includes an SD memory card slot and a USB port or a serial port of another standard, and the like.

The communication portion 25 has at least one of a wireless module (not shown in the drawings) and a wired module (not shown in the drawings). The CPU 11 can communicate bilaterally with the printing apparatus 1, the terminal device 2, and the server 3 via the network 4 by the communication portion 25. The pretreatment device 10 may be connected to the printing apparatus 1, the terminal device 2, and the server 3 via the network 4 by a wireless module capable of connecting to the USB port. When the printing apparatus 1, the terminal device 2, and the server 3 are connected to the input/output portion 24 via the wireless module, the CPU 11 can communicate bilaterally with the printing apparatus 1, the terminal apparatus 2, and the server 3 via the input/output section 24.

Electrical Configuration of Printing Apparatus 1

Figure 3:
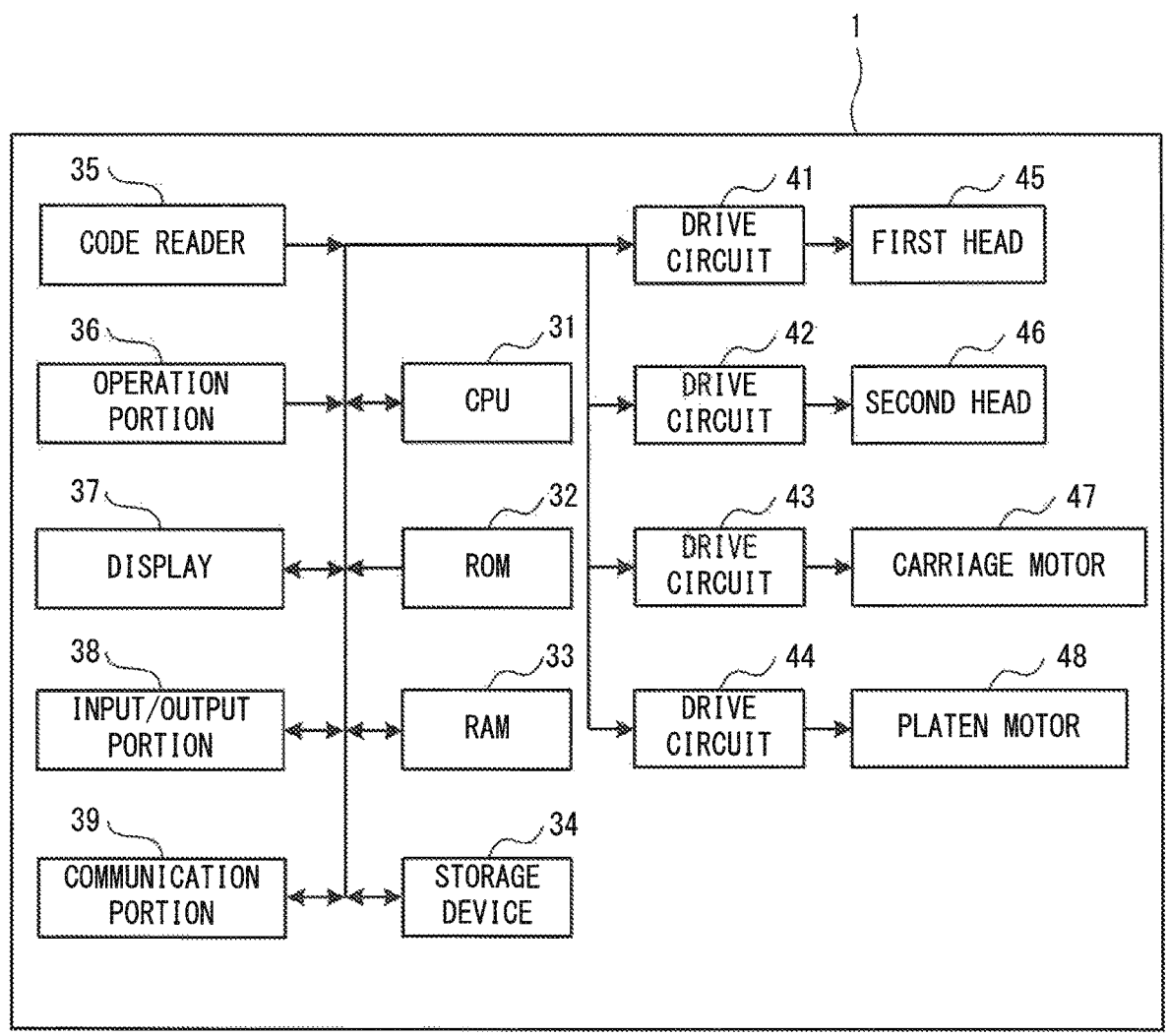
FIG. 3 is a block diagram showing a first example of the general electrical configuration of the printing apparatus 1.

As shown in FIG. 3, the printing apparatus 1 includes a CPU 31, ROM 32, RAM 33, a storage device 34, the code reader 35, an operation portion 36, a display 37, an input/output portion 38, a communication portion 39, and drive circuits 41 to 44 and the like. Each configuration of the printing apparatus 1 is connected together via a bus. The CPU 31 controls the printing apparatus 1, and reads various programs from the ROM 32, and executes various processing using the RAM 33 as working memory. For example, the CPU 31 reads a first main processing program from the ROM 32 and executes a first main processing. The storage device 34 is a non-volatile storage device such as flash memory or an HDD. The storage device 34 stores various tables such as the first table 81 and various parameters and the like.

The code reader 35 reads information from a one-dimensional code such as a barcode, a two-dimensional code such as a QR code, and a three-dimensional or other code, which are attached to a treatment medium such as cloth, and inputs this information into the CPU 31. Information of a code such as a one-dimensional code is identification information associated with the treatment medium such as cloth.

The operation portion 36 includes an operating panel (not shown in the drawings). The operating panel includes buttons or the like, for example. Therefore, instructions from the operator are input to the CPU 31 via the operation portion 36. Also, when the code attached to a treatment medium such as cloth is a barcode, the operator may input a number string written together with the barcode via the operation portion 36. The display 37 is formed by a well-known display device or the like. The display 37 may include a touch panel (not shown in the drawings) and function as the operation portion 36. The input/output portion 38 includes an SD memory card slot and a USB port or a serial port of another standard, and the like.

The communication portion 39 has at least one of a wireless module (not shown in the drawings) and a wired module (not shown in the drawings). The CPU 31 can communicate bilaterally with the pretreatment device 10, the terminal device 2, and the server 3 via the network 4 by the communication portion 39. The printing apparatus 1 may be connected to the pretreatment device 10, the terminal device 2, and the server 3 via the network 4 by a wireless module capable of connecting to the USB port. When the pretreatment device 10, the terminal device 2, and the server 3 are connected to the input/output portion 38 via the wireless module, the CPU 11 can communicate bilaterally with the pretreatment device 10, the terminal device 2, and the server 3 via the input/output section 38.

The drive circuit 41 is connected to a first head 45 and discharges droplets of colored ink from each nozzle (not shown in the drawings) of the first head 45 under the control of the CPU 31. The drive circuit 42 is connected to a second head 46 and discharges droplets of white ink from each nozzle (not shown in the drawings) of the second head 46 under the control of the CPU 31. The drive circuit 43 is connected to a carriage motor 47 and drives the carriage motor 47 under the control of the CPU 31. The drive circuit 44 is connected to a platen motor 48 and drives the platen motor 48 under the control of the CPU 31.

Electrical Configuration of Terminal Device 2

Figure 4:
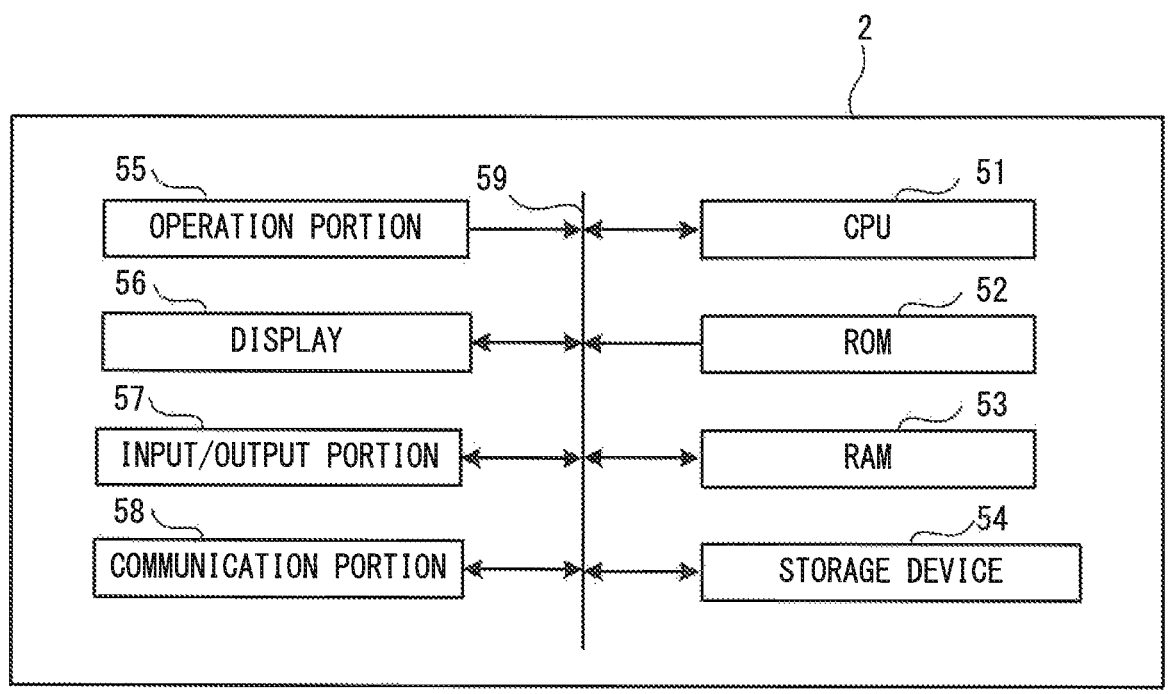
FIG. 4 is a block diagram showing a first example of the general electrical configuration of a terminal device 2.

The terminal device 2 is, for example, a Personal Computer (PC), a tablet, or a smart phone or the like. As shown in FIG. 4, the terminal device 2 includes a CPU 51, ROM 52, RAM 53, a storage device 54, an operation portion 55, a display 56, an input/output portion 57, and a communication portion 58 and the like. Each configuration of the terminal device 2 is connected together via a bus 59. The CPU 51 controls the terminal device 2, and reads various programs from the storage device 54, and executes various processing using the RAM 53 as working memory. The storage device 54 stores various programs and various information and the like. The storage device 54 is a non-volatile storage device such as an HDD or flash memory or the like, for example.

The operation portion 55 includes a keyboard (not shown in the drawings) or an operating panel (including a touch panel) or the like. The keyboard or operating panel includes buttons or the like, for example. Therefore, instructions from the operator are input to the CPU 51 via the operation portion 55. The display 56 is formed by a well-known display device or the like. The display 56 may include a touch panel (not shown in the drawings) and function as the operation portion 55. The input/output portion 57 includes an SD memory card slot and a USB port or a serial port of another standard, and the like.

The communication portion 58 has at least one of a wireless module (not shown in the drawings) and a wired module (not shown in the drawings). The CPU 51 can communicate bilaterally with the pretreatment device 10, the printing apparatus 1, and the server 3 via the network 4 by the communication portion 58. The terminal device 2 may be connected to the pretreatment device 10, the printing apparatus 1, and the server 3 via the network 4 by a wireless module capable of connecting to the USB port. When the pretreatment device 10, the printing apparatus 1, and the server 3 are connected to the input/output portion 58 via the wireless module, the CPU 51 can communicate bilaterally with the pretreatment device 10, the printing apparatus 1, and the server 3 via the input/output section 58.

Electrical Configuration of Server 3

Figure 5:
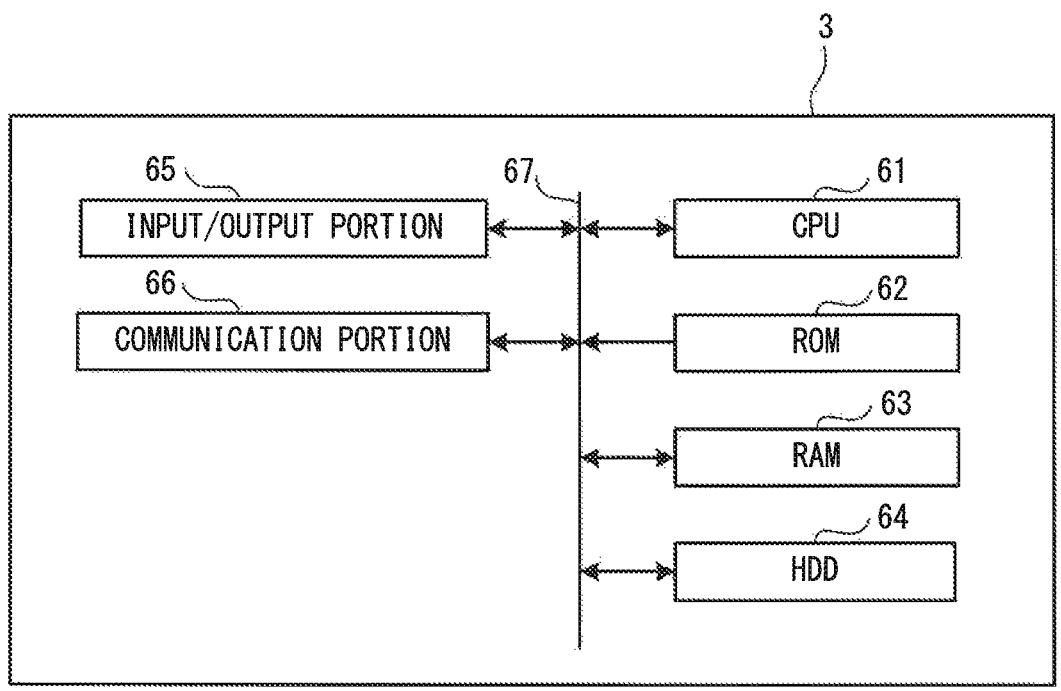
FIG. 5 is a block diagram showing an example of the general electrical configuration of a server 3.

As shown in FIG. 5, the server 3 includes a CPU 61, ROM 62, RAM 63, an HDD 64, an input/output portion 65, and a communication portion 66 and the like. Each configuration of the server 3 is connected together via a bus 67. The CPU 61 controls the server 3, and reads various programs from the HDD 64, and executes various processing using the RAM 63 as working memory. The HDD 64 stores various tables such as a third table 83, various programs, and various information and the like.

The communication portion 66 has at least one of a wireless module (not shown in the drawings) and a wired module (not shown in the drawings). The CPU 61 can communicate bilaterally with the pretreatment device 10, the printing apparatus 1, and the terminal device 2 via the network 4 by the communication portion 66. The server 3 may be connected to the pretreatment device 10, the printing apparatus 1, and the terminal device 2 via the network 4 by a wireless module capable of connecting to the USB port. When the pretreatment device 10, the printing apparatus 1, and the terminal device 2 are connected to the input/output portion 65 via the wireless module, the CPU 61 can communicate bilaterally with the pretreatment device 10, the printing apparatus 1, and the terminal device 2 via the input/output section 65.

First Table 81

As shown in FIG. 6, the first table 81 is a table in which the identification information and the pretreatment instruction are associated with each other. In the present embodiment, the first table 81 is stored in the storage device 34 of the printing apparatus 1, as described above. The pretreatment instruction includes application treatment information related to application treatment and heat treatment information related to heat treatment, as described above. In the example in FIG. 6, the application treatment information includes the application amount per unit area ($mg/cm^2$), the application range, and the type of pretreatment agent. The application amount per unit area ($mg/cm^2$) is information indicating the application amount per unit area ($mg/cm^2$) of the pretreatment agent. The application range is information indicating the area over which the pretreatment agent is to be applied. The type of pretreatment agent is information indicating the type of the pretreatment agent.

In the example in FIG. 6, the heat treatment information includes a heat treatment pressure ($N/cm^2$), heat treatment time period (sec), heat treatment temperature (° C.), heat treatment range, and the number of heat treatments. The heat treatment pressure ($N/cm^2$) is the value of the pressure applied to the cloth at the time of heat treatment, when the heat treatment portion 50 is a heat press or a heat roller or the like that applies pressure to the treatment medium that is to be heat treated. Therefore, when the heat treatment portion 50 is a near infrared heater or a blower or the like that not in contact with the treatment medium, the value of the heat treatment pressure is set to a null (-) value. The heat treatment time period (sec) is the time for which heat treatment is performed. The heat treatment temperature (° C.) is the temperature of the heat treatment. The heat treatment range is the area over which heat treatment is performed. The number of heat treatments is the number of times that the heat treatment of a set heat treatment time period (sec) is repeated.

Second Table 82

As shown in FIG. 7, the second table 82 is a table in which the application section in the X-axis direction of the platen is associated with each spray of the application portion 18. The second table 82 is stored in the flash memory 14 of the pretreatment device 10, as described above. The second table 82 shown in FIG. 7 is an example of a case where there are seven sprays. For example, the application section of spray (3) is [b, c]. That is, the spray (3) can spray in the application section [b, c].

Third Table 83

Figure 8:
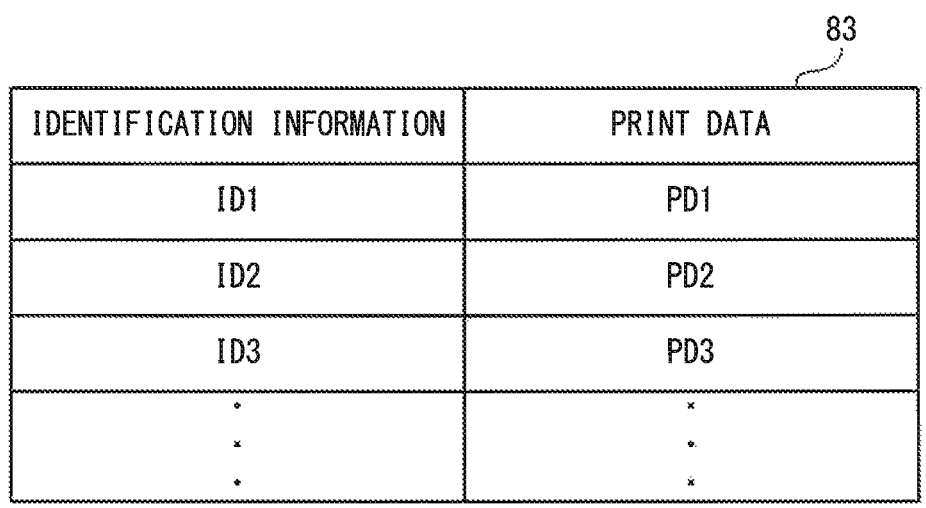
FIG. 8 is a view showing an example of a third table 83.

As shown in FIG. 8, the third table 83 is a table in which the identification information and the print data are associated with each other. In the present embodiment, the third table 83 is stored in the HDD 64 of the server 3, as described above.

First Main Processing

Figure 9:
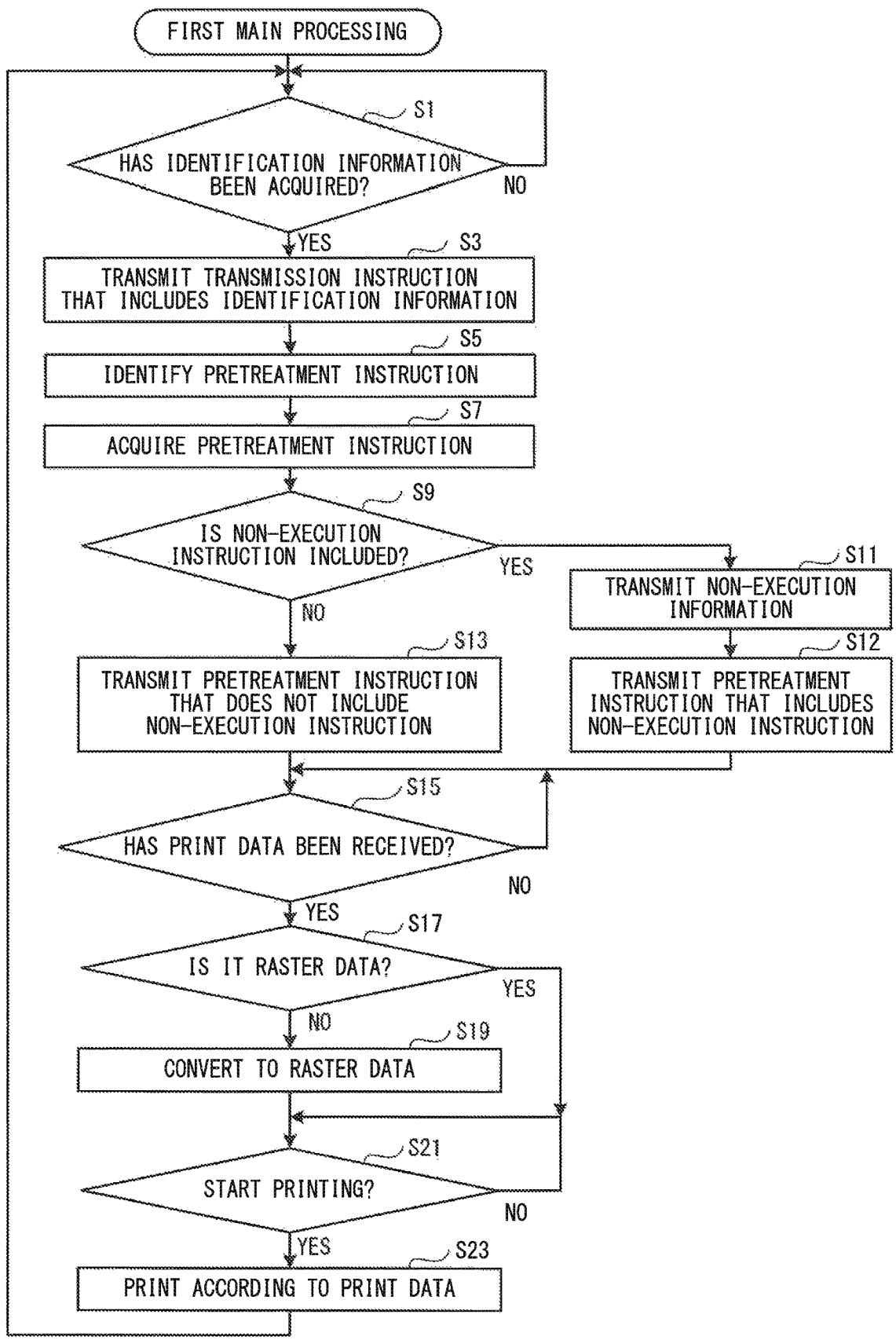
FIG. 9 is a flowchart of a first main processing.

The flow of the first main processing will now be described with reference to FIG. 9. The CPU 31 of the printing apparatus 1 reads the first main processing program from the ROM 32, and executes the first main processing using the RAM 33 as working memory. The start of the first main processing is triggered by a power supply of the printing apparatus 1 being turned on, for example.

The CPU 31 determines whether identification information has been acquired (step S1). More specifically, the CPU 31 determines whether identification information has been acquired by determining whether identification information of the treatment medium read by the code reader 35 has been input to the CPU 31. If it is determined that identification information has not been acquired (no at step S1), the CPU 31 repeats the processing in step S1.

If it is determined that identification information has been acquired (yes at step S1), the CPU 31 transmits a transmission instruction that includes the acquired identification information to the server 3 via the communication portion 39, for example (step S3). The server 3 that has received the transmission instruction traces the identification information column in the third table 83 and identifies the identification information that matches the identification information included in the transmission instruction. The server 3 identifies the print data corresponding to the identification information identified in the third table 83. The server 3 transmits the identified print data back to the printing apparatus 1 that transmitted the transmission instruction.

The CPU 31 identifies a pretreatment instruction based on the acquired identification information (step S5). More specifically, the CPU 31 traces the identification information column in the first table 81 and identifies the identification information that matches the acquired identification information. The CPU 31 identifies the pretreatment instruction that corresponds to the identified identification information, based on the first table 81.

The CPU 31 acquires the identified pretreatment instruction from the first table 81 (step S7). The CPU 31 determines whether the acquired identification information includes a non-execution instruction (step S9). The non-execution instruction is information indicating non-execution of the pretreatment. If it is determined that the acquired identification information includes the non-execution instruction (yes at step S9), the CPU 31 transmits, via the communication portion 39, non-execution information to the terminal device 2 or the pretreatment device 10 connected via the network 4, for example (step S11). The non-execution information is information indicating that the pretreatment is not to be executed. The pretreatment device 10 or the terminal device 2 that has received the non-execution information displays that pretreatment is not to be executed, on the display. The CPU 31 transmits a pretreatment instruction that includes the non-execution instruction to the pretreatment device 10 that will execute pretreatment with respect to the treatment medium (step S12). The pretreatment device 10 that has received the pretreatment instruction that includes the non-execution instruction will not execute pretreatment in accordance with the non-execution instruction. The CPU 31 then advances the processing to step S15.

If it is determined that the acquired identification information does not include the non-execution instruction (no at step S9), the CPU 31 transmits, via the communication portion 39, a pretreatment instruction that does not include the non-execution instruction to the pretreatment device 10 that executes pretreatment with respect to the treatment medium, for example (step S13).

The CPU 31 transmits a transmission instruction instructing print data to be transmitted to the server 3, in the processing in step S3, so the CPU 31 determines whether the print data has been received from the server 3 (step S15). More specifically, the CPU 31 determines whether the print data has been received by determining whether the print data from the communication portion 39 has been input to the CPU 31. If it is determined that the print data has not been received (no at step S15), the CPU 31 repeats the processing in step S15. If it is determined that the print data has been received (yes at step S15), the CPU 31 determines whether the received print data is raster data (step S17). More specifically, the CPU 31 determines whether the print data is raster data by analyzing the print data and identifying the data format.

If it is determined that the print data is raster data, (yes at step S17), the CPU 31 advances the processing to step S21. If it is determined that the print data is not raster data (no at step S17), the CPU 31 converts the print data to raster data based on an existing conversion method (step S19). The CPU 31 determines whether there is an instruction to start printing (step S21). The instruction to start printing is information that instructs printing to start. For example, if an instruction to start printing has been input from the operation portion 36, or if an instruction to start printing has been input from the terminal device 2, the CPU 31 determines that an instruction to start printing has been input (yes at step S21).

If it is determined that there is no instruction to start printing (no at step S21), the CPU 31 repeats the processing in step S21. If it is determined that there is an instruction to start printing (yes at step S21), the CPU 31 controls the drive circuits 41 to 44 and executes printing on the treatment medium according to the print data (step S23). The CPU 31 then returns the processing to step S1.

Main Operation and Effects of First Embodiment

According to the first embodiment described above, the printing apparatus 1 functions as a pretreatment control apparatus and acquires the identification information of the treatment medium with the code reader 35. The printing apparatus 1 refers to the first table 81 held in the printing apparatus 1 and acquires the pretreatment instruction corresponding to the acquired identification information. The printing apparatus 1 transmits a transmission instruction instructing print data corresponding to the acquired identification information to be transmitted, to the server 3 having the HDD 64 that stores the print data, as well as transmits a pretreatment instruction based on the identification information to the pretreatment device 10 that executes pretreatment with respect to the treatment medium. As a result, the printing apparatus 1 can transmit the pretreatment instruction and transmit the print data from the server 3 by acquiring a single piece of identification information. Therefore, the number of processing steps by the printing apparatus 1 is fewer than when transmitting the pretreatment instruction and transmitting the print data from the server 3 by acquiring different information.

According to the first main processing of the first embodiment described above, the printing apparatus 1 transmits, to the server 3, the transmission instruction instructing print data corresponding to the acquired identification information to be transmitted (step S3), before transmitting the pretreatment instruction to the pretreatment device 10 (step S13). That is, the printing apparatus 1 transmits the transmission instruction to the server 3 before the pretreatment device 10 completes the pretreatment with respect to the treatment medium. As a result, the printing apparatus 1 is more likely to finish acquiring the print data by the time the pretreatment by the pretreatment device 10 is complete. Therefore, it is less likely that there will be waiting time until the start of the printing processing after pretreatment is complete.

According to the first embodiment described above, when the non-execution instruction is included in the acquired identification information, the printing apparatus 1 transmits the pretreatment instruction that includes the non-execution instruction to the pretreatment device 10 that executes pretreatment with respect to the treatment medium. Therefore, the printing apparatus 1 can notify the pretreatment device 10 as to whether to execute the pretreatment.

According to the first embodiment described above, when the non-execution instruction is included in the identification information, the printing apparatus 1 transmits the non-execution information to the terminal device 2 or the pretreatment device 10, and causes the display to display that pretreatment is not to be executed. As a result, the printing apparatus 1 can reduce the likelihood that the treatment medium will be end up being set in the pretreatment device 10 even though pretreatment will not be executed.

Second Embodiment

The pretreatment control apparatus according to a second embodiment is the printing apparatus 1. The storage device that stores the print data of the second embodiment is the HDD 64 of the server 3. The printing apparatus 1 acquires identification information of a treatment medium with the code reader 35 and transmits a transmission instruction that includes the acquired identification information to the server 3 that includes the HDD 64 that stores the print data. The printing apparatus 1 acquires a pretreatment instruction by transmitting a pretreatment instruction request including identification information to any one of the terminal device 2, the server 3, and the pretreatment device 10 that holds the pretreatment instruction.

The printing apparatus 1 transmits the acquired pretreatment instruction to the pretreatment device 10 that executes pretreatment with respect to the treatment medium. That is, the printing apparatus 1 transmits the pretreatment instruction acquired by transmitting the pretreatment instruction request including the identification information, to any one of the terminal device 2, the server 3, and the pretreatment device 10 that holds the pretreatment instruction. Therefore, the printing apparatus 1 transmits a pretreatment instruction based on the identification information to the pretreatment device 10 that executes pretreatment with respect to the treatment medium. The pretreatment instruction request is information requesting that the pretreatment instruction corresponding to the identification information, including the identification information, be transmitted.

The electrical configuration of each of the printing apparatus 1, the terminal device 2, the server 3, and the pretreatment device 10 is the same as it is in the first embodiment, so a description thereof will be omitted. However, the first table 81 is stored in the storage device of any one of the terminal device 2, the server 3, and the pretreatment device 10.

Second Main Processing

Figure 10:
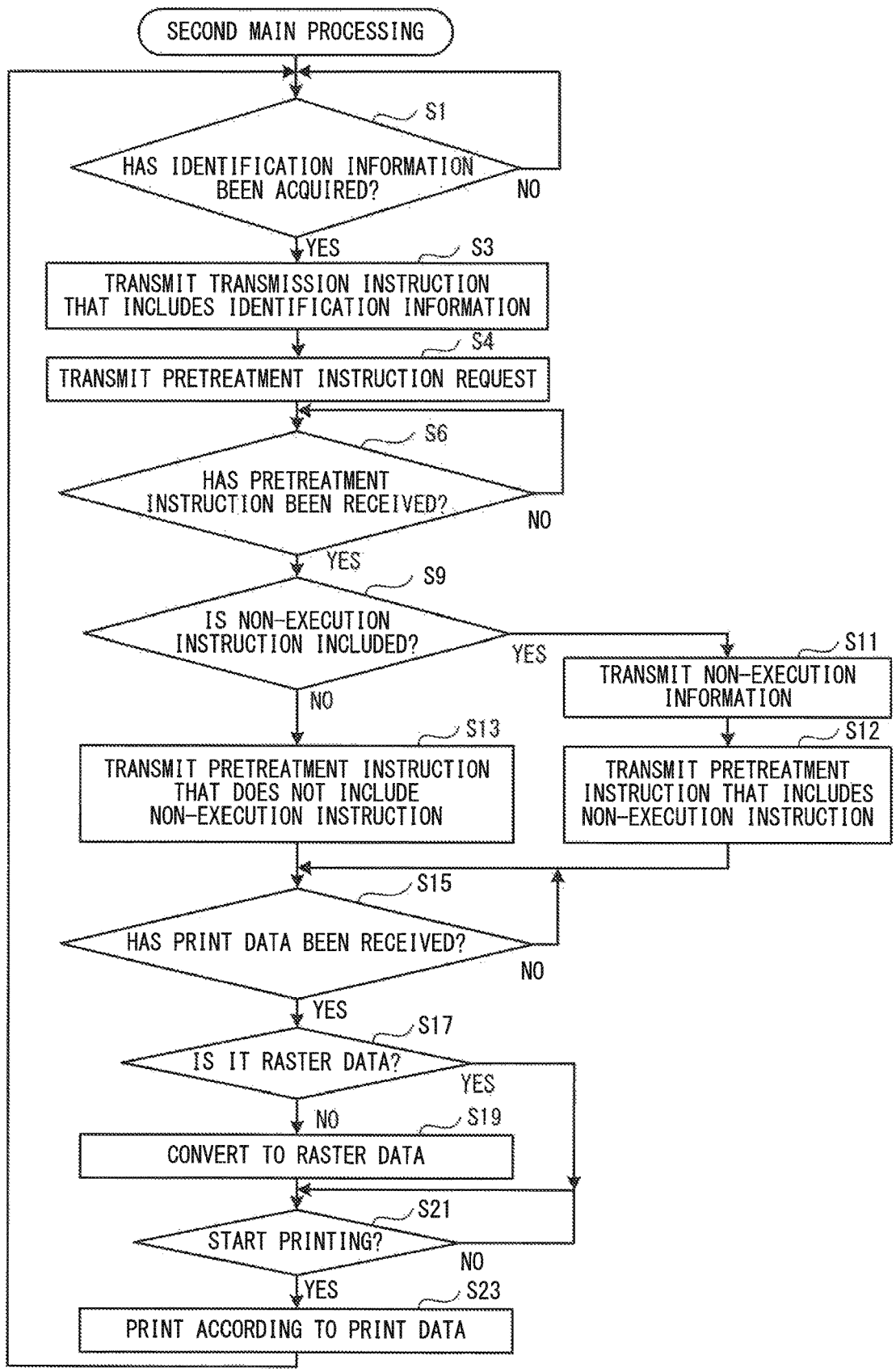
FIG. 10 is a flowchart of a second main processing.

The flow of a second main processing will now be described with reference to FIG. 10. The CPU 31 of the printing apparatus 1 reads a second main processing program from the ROM 32, and executes the second main processing using the RAM 33 as working memory. The start of the second main processing is triggered by the power supply of the printing apparatus 1 being turned on, for example. Processing that is the same as that in the first main processing will be denoted by the same step numbers as in the first main processing and descriptions of that processing will be omitted.

After executing the processing in steps S1 and S3 in the same way as the first main processing, the CPU 31 transmits a pretreatment instruction request to any one of the terminal device 2, the server 3, and the pretreatment device 10 that holds the first table 81 (step S4). Whichever one of the terminal device 2, the server 3, and the pretreatment device 10 that has received the pretreatment instruction request then refers to the first table 81 and identifies the pretreatment instruction corresponding to the identification information. The one of the terminal device 2, the server 3, and the pretreatment device 10 then transmits back the identified pretreatment instruction to the printing apparatus 1 that transmitted the pretreatment instruction request.

The CPU 31 determines whether a pretreatment instruction has been received (step S6). For example, when the communication portion 39 receives a pretreatment instruction, the received pretreatment instruction is input to the CPU 31. The CPU 31 determines whether the pretreatment instruction has been received, by determining whether the pretreatment instruction has been received. If it is determined that the pretreatment instruction has not been received (no at step S6), the CPU 31 repeats the processing in step S6. If it is determined that the pretreatment instruction has been received (yes at step S6), the CPU 31 performs the processing in steps S9 to S23, similar to the first main processing. The CPU 31 then returns the processing to step S1.

Main Operation and Effects of Second Embodiment

According to the second embodiment described above, the printing apparatus 1 functions as the pretreatment control apparatus and acquires the identification information of the treatment medium with the code reader 35. The printing apparatus 1 acquires a pretreatment instruction by transmitting a pretreatment instruction request to any one of the terminal device 2, the server 3, and the pretreatment device 10 holding the first table 81. The printing apparatus 1 transmits a transmission instruction instructing print data corresponding to the acquired identification information to be transmitted, to the server 3 having the HDD 64 that stores the print data, as well as transmits a pretreatment instruction based on the identification information to the pretreatment device 10 that executes pretreatment with respect to the treatment medium. As a result, the printing apparatus 1 can transmit the pretreatment instruction and transmit the print data from the server 3 by acquiring a single piece of identification information. Therefore, the number of processing steps by the printing apparatus 1 is fewer than when transmitting the pretreatment instruction and transmitting the print data from the server 3 by acquiring different information.

According to the second embodiment described above, the printing apparatus 1 transmits a transmission instruction instructing the print data corresponding to the acquired identification information to be transmitted, to the server 3 before transmitting the pretreatment instruction to the pretreatment device 10. That is, the printing apparatus 1 transmits the transmission instruction to the server 3 before the pretreatment device 10 completes pretreatment with respect to the treatment medium. As a result, the printing apparatus 1 is more likely to finish acquiring the print data by the time the pretreatment by the pretreatment device 10 is complete. Therefore, it is less likely that there will be waiting time until the start of the printing processing after pretreatment is complete.

According to the second embodiment described above, when the non-execution instruction is included in the acquired identification information, the printing apparatus 1 transmits the pretreatment instruction that includes the non-execution instruction to the pretreatment device 10 that executes pretreatment with respect to the treatment medium. Therefore, the printing apparatus 1 can notify the pretreatment device 10 as to whether to execute pretreatment.

According to the second embodiment described above, when the non-execution instruction is included in the identification information, the printing apparatus 1 transmits the non-execution information to the terminal device 2 or the pretreatment device 10, and causes the display to display that pretreatment is not to be executed. As a result, the printing apparatus 1 can reduce the likelihood that the treatment medium will end up being set in the pretreatment device 10 even though pretreatment will not be executed.

Third Embodiment

The pretreatment control apparatus according to a third embodiment is the printing apparatus 1. The storage device that stores the print data of the third embodiment is the HDD 64 of the server 3. The printing apparatus 1 acquires identification information of a treatment medium with the code reader 35 and transmits a transmission instruction that includes the acquired identification information to the server 3 that includes the HDD 64 that stores the print data. The printing apparatus 1 transmits a first acquisition instruction that includes identification information to the pretreatment device 10 that executes pretreatment with respect to the treatment medium. The first acquisition portion is information instructing the acquisition of the pretreatment instruction. That is, the printing apparatus 1 causes the pretreatment device 10 that executes pretreatment to acquire the pretreatment instruction.

The electrical configuration of each of the printing apparatus 1, the terminal device 2, the server 3, and the pretreatment device 10 is the same as it is in the first embodiment, so a description thereof will be omitted. However, the first table 81 is stored in the storage device of any one of the printing apparatus 1, the terminal device 2, the server 3, and the pretreatment device 10.

Third Main Processing

Figure 11:
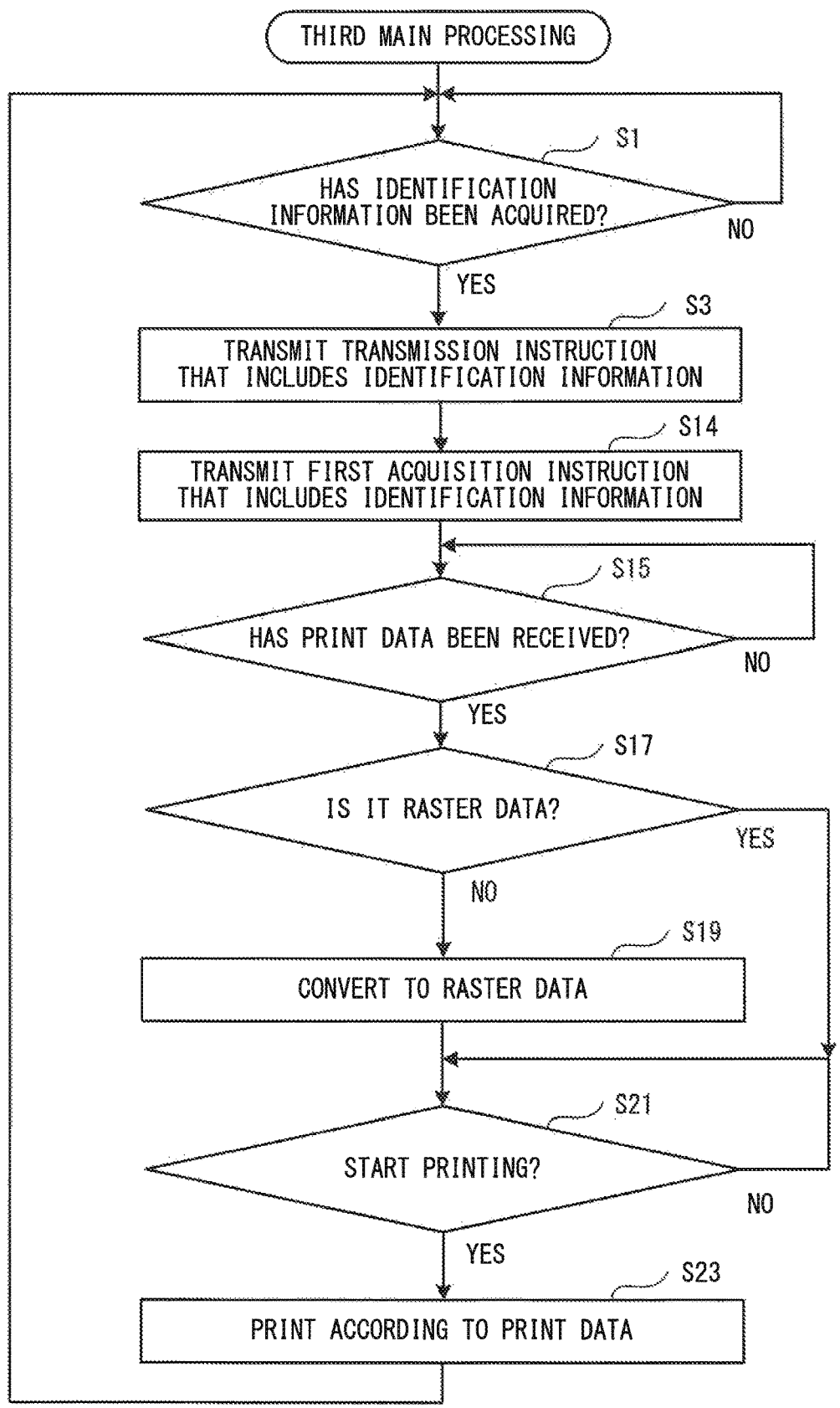
FIG. 11 is a flowchart of a third main processing.

The flow of a third main processing will now be described with reference to FIG. 11. The CPU 31 of the printing apparatus 1 reads a third main processing program from the ROM 32, and executes the third main processing using the RAM 33 as working memory. The start of the third main processing is triggered by the power supply of the printing apparatus 1 being turned on, for example. Processing that is the same as that in the first main processing will be denoted by the same step numbers as in the first main processing and descriptions of that processing will be omitted.

After executing the processing in steps S1 and S3 in the same way as the first main processing, the CPU 31 transmits the first acquisition instruction including identification information to the pretreatment device 10 that executes pretreatment with respect to the treatment medium (step S14). If the pretreatment device 10 that has received the first acquisition instruction is holding the first table 81, the pretreatment device 10 refers to the first table 81 and acquires the pretreatment instruction corresponding to the identification information. If the pretreatment device 10 is not holding the first table 81, the pretreatment device 10 acquires a pretreatment instruction corresponding to the identification information, by transmitting a pretreatment instruction request that includes the identification information to any one of the printing apparatus 1, the terminal device 2, and the server 3 that holds the first table 81. The CPU 31. then executes the processing in steps S15 to S23, similar to the first main processing. The CPU 31 then returns the processing to step S1.

Main Operation and Effects of Third Embodiment

According to the third embodiment described above, the printing apparatus 1 functions as the pretreatment control apparatus and acquires the identification information of the treatment medium with the code reader 35. The printing apparatus 1 transmits a transmission instruction instructing print data corresponding to the acquired identification information to be transmitted, to the server 3 having the HDD 64 that stores the print data, as well as transmits the first acquisition instruction to the pretreatment device 10 that executes pretreatment with respect to the treatment medium. As a result, the printing apparatus 1 can acquire the pretreatment instruction and transmit the print data from the server 3 by acquiring a single piece of identification information. Therefore, the number of processing steps by the printing apparatus 1 is fewer than when the pretreatment instruction is acquired and the print data is transmitted from the server 3 by acquiring different information.

According to the third embodiment described above, the printing apparatus 1 transmits a transmission instruction instructing the print data corresponding to the acquired identification information to be transmitted, to the server 3 before transmitting the first acquisition instruction to the pretreatment device 10. That is, the printing apparatus 1 transmits the transmission instruction to the server 3 before the pretreatment device 10 completes pretreatment with respect to the treatment medium. As a result, the printing apparatus 1 is more likely to finish acquiring the print data by the time the pretreatment by the pretreatment device 10 is complete. Therefore, it is less likely that there will be waiting time until the start of the printing processing after pretreatment is complete.

Fourth Embodiment

The pretreatment control apparatus according to a fourth embodiment is the pretreatment device 10. The storage device that stores the print data of the fourth embodiment is the HDD 64 of the server 3. The pretreatment device 10 acquires identification information of the treatment medium via a code reader 21. The pretreatment device 10 acquires a pretreatment instruction based on the identification information acquired from the first table 81 held in the pretreatment device 10, and transmits a transmission instruction that includes the identification information to the server 3.

Figure 12:
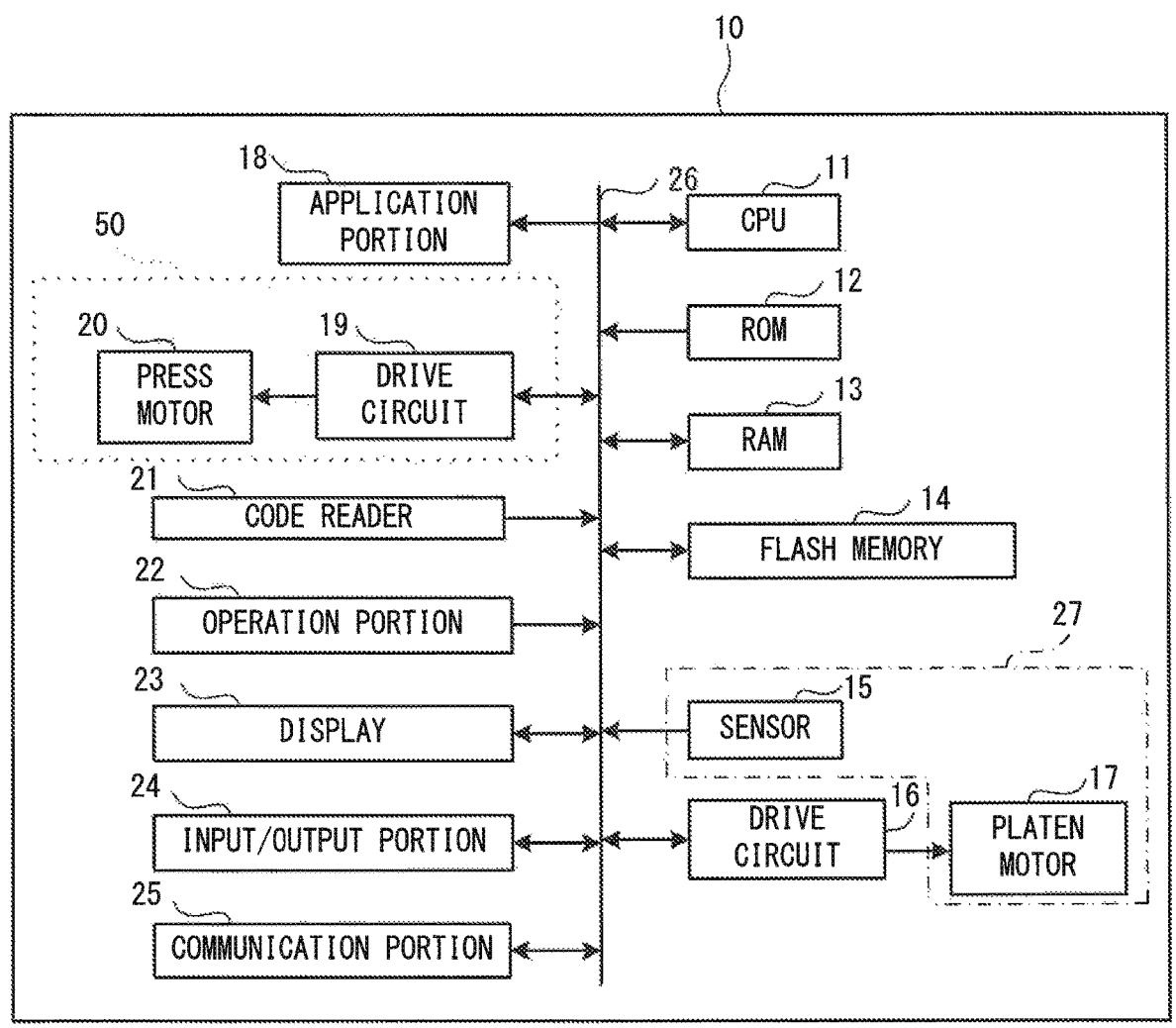
FIG. 12 is a block diagram showing a second example of the general electrical configuration of the pretreatment device 10.
Figure 13:
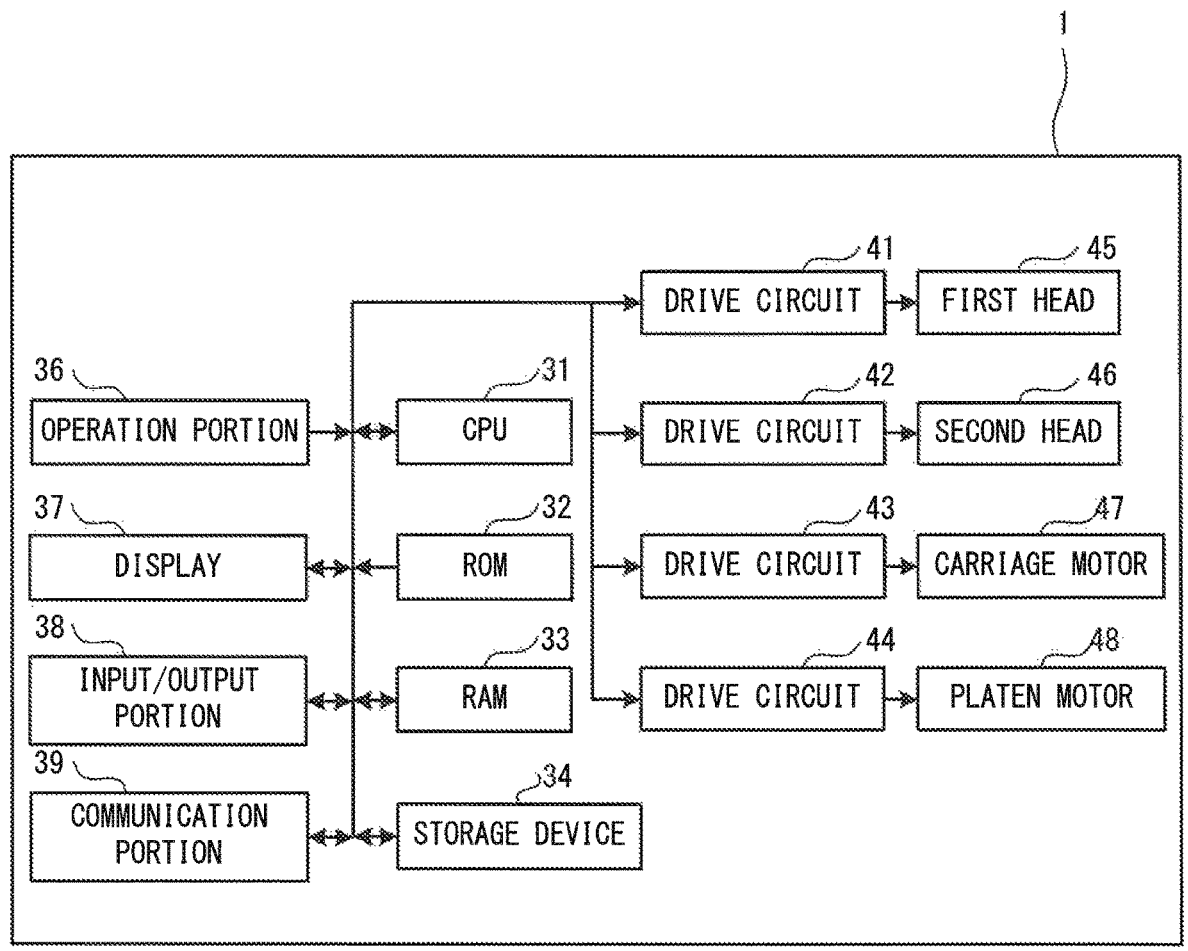
FIG. 13 is a block diagram showing a second example of the general electrical configuration of the printing apparatus 1.

The electrical configuration of each of the terminal device 2 and the server 3 is the same as it is in the first embodiment, so a description thereof will be omitted. However, as shown in FIG. 13, the printing apparatus 1 does not include a code reader. Instead, the pretreatment device 10 is provided with the code reader 21, as shown in FIG. 12. The other electrical configuration of the printing apparatus 1 and the pretreatment device 10 is the same as it is in the first embodiment, so a description thereof will be omitted. Also, the first table 81 is stored in the flash memory 14 of the pretreatment device 10.

Fourth Main Processing

Figure 14:
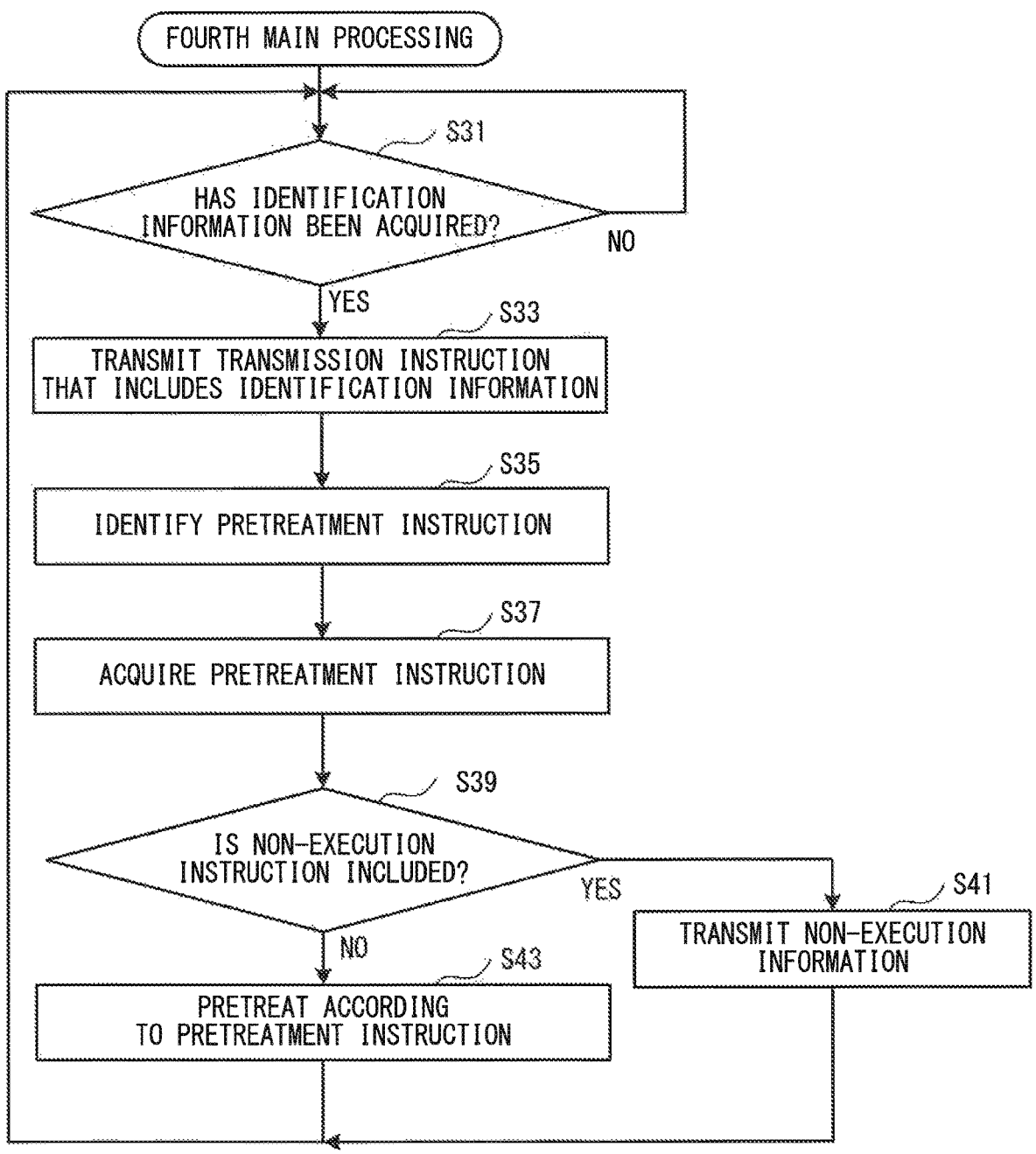
FIG. 14 is a flowchart of a fourth main processing.

The flow of a fourth main processing will now be described with reference to FIG. 14. The CPU 11 of the pretreatment device 10 reads a fourth main processing program from the ROM 12, and executes the fourth main processing using the RAM 13 as working memory. The start of the fourth main processing is triggered by the power supply of the pretreatment device 10 being turned on, for example.

The CPU 11 determines whether identification information has been acquired (step S31). More specifically, the CPU 11 determines whether identification information has been acquired by determining whether identification information of the treatment medium read by the code reader 21 has been input to the CPU 11. If it is determined that the identification information has not been acquired (no at step S31), the CPU 11 repeats the processing in step S31.

If it is determined that the identification information has been acquired (yes at step S31), the CPU 11 transmits, via the communication portion 25, a transmission instruction that includes the acquired identification information to the server 3 that includes the HDD 64 that stores the print data, for example (step S33). The processing in step S33 is the same as the processing in step S3 in the first main processing. Therefore, a description of processing performed by the server 3 that has received the transmission instruction will be omitted. The CPU 11 identifies the pretreatment instruction based on the acquired identification information (step S35). More specifically, the CPU 11 traces the identification information column in the first table 81 and identifies the identification information that matches the acquired identification information. The CPU 11 identifies the pretreatment instruction corresponding to the identification information identified in the first table 81.

The CPU 11 acquires the identified pretreatment instruction from the first table 81 (step S37). The CPU 11 determines whether the acquired identification information includes a non-execution instruction (step S39). If it is determined that the acquired identification information includes the non-execution instruction (yes at step S39), the CPU 11 transmits, via the communication portion 25, non-execution information to the terminal device 2 or the printing apparatus 1 connected via the network 4, for example (step S41). The CPU 11 then returns the processing to step S31. The printing apparatus 1 or the terminal device 2 that has received the non-execution information displays that pretreatment is not to be executed, on the display.

If it is determined that the acquired identification information does not include the non-execution instruction (no at step S39), the CPU 11 executes pretreatment with respect to the treatment medium in accordance with the acquired pretreatment instruction (step S43). The CPU 11 then returns to the processing in step S31.

Main Operation and Effects of Fourth Embodiment

According to the fourth embodiment described above, the pretreatment device 10 functions as the pretreatment control apparatus and acquires the identification information of the treatment medium with the code reader 21. The pretreatment device 10 references the held first table 81 and acquires a pretreatment instruction corresponding to the acquired identification information. The pretreatment device 10 transmits a transmission instruction instructing print data corresponding to the acquired identification information to be transmitted, to the server 3 having the HDD 64 that stores the print data. As a result, the pretreatment device 10 can acquire the pretreatment instruction and transmit the print data from the server 3 by acquiring a single piece of identification information. Therefore, the number of processing steps by the pretreatment device 10 is fewer than when acquiring the pretreatment instruction and transmitting print data from the server 3 by acquiring different information.

According to the fourth embodiment, the pretreatment device 10 transmits the transmission instruction instructing print data corresponding to the acquired identification information to be transmitted, to the server 3 before acquiring the pretreatment instruction. That is, the pretreatment device 10 transmits the transmission instruction to the server 3 before finishing the pretreatment with respect to the treatment medium. As a result, the printing apparatus 1 is more likely to finish acquiring the print data by the time the pretreatment by the pretreatment device 10 is complete. Therefore, it is less likely that there will be waiting time until the start of the printing processing after pretreatment is complete.

According to the fourth embodiment described above, when a non-execution instruction is included in the identification information, the pretreatment device 10 transmits the non-execution information to the printing apparatus 1 or the terminal device 2, and causes the display to display that pretreatment will not be executed. As a result, the pretreatment device 10 can reduce the likelihood that the treatment medium will end up being set even though pretreatment is not to be executed.

According to the fourth embodiment described above, when the non-execution instruction is included in the identification information, the pretreatment device 10 will not execute pretreatment with respect to the treatment medium. As a result, the pretreatment device 10 can determine whether to execute pretreatment with respect to the treatment medium according to whether the non-execution instruction is included in the identification information. Therefore, the pretreatment device 10 can reduce the likelihood of human error such as executing pretreatment with respect to a treatment medium that does not need to be pretreated.

Fifth Embodiment

The pretreatment control apparatus according to a fifth embodiment is the pretreatment device 10. The storage device that stores the print data of the fifth embodiment is the HDD 64 of the server 3. The pretreatment device 10 acquires identification information of the treatment medium with the code reader 21. The pretreatment device 10 acquires a pretreatment instruction based on the identification information from the held first table 81. The pretreatment device 10 transmits a second acquisition instruction that includes the identification information to the printing apparatus 1 that executes printing with respect to the treatment medium. The second acquisition instruction is information instructing the acquisition of print data.

The electrical configuration of each of the printing apparatus 1, the terminal device 2, the server 3, and the pretreatment device 10 is the same as it is in the fourth embodiment, so a description thereof will be omitted.

Fifth Main Processing

Figure 15:
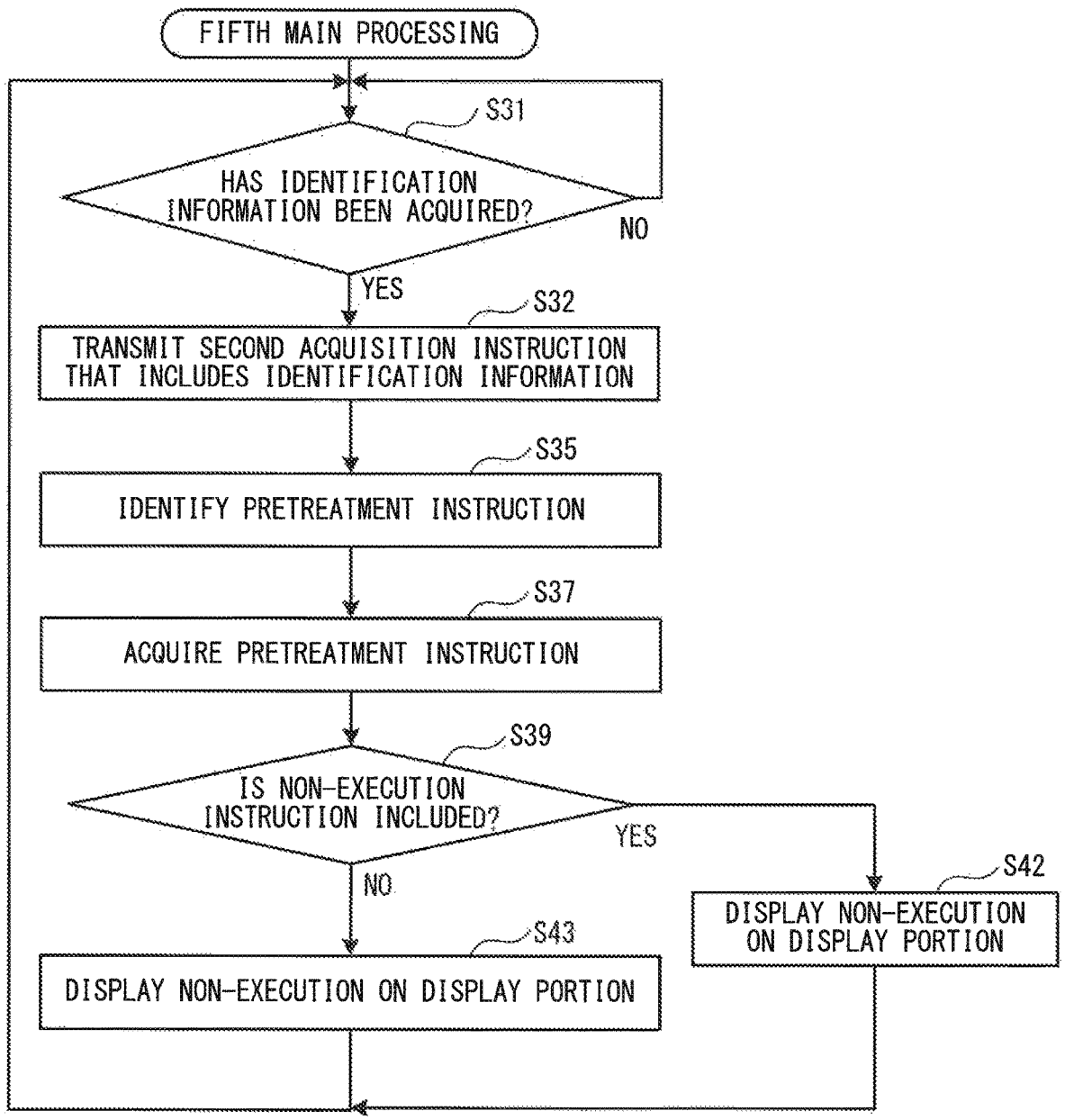
FIG. 15 is a flowchart of a fifth main processing.

The flow of a fifth main processing will be described with reference to FIG. 15. The CPU 11 of the pretreatment device 10 reads a fifth main processing program from the ROM 12, and executes the fifth main processing using the RAM 13 as working memory. The start of the fifth main processing is triggered by the power supply of the pretreatment device 10 being turned on, for example. Processing that is the same as that in the fourth main processing will be denoted by the same step numbers as in the fourth main processing and descriptions of that processing will be omitted.

After executing the processing in step S31 in the same way as the fourth main processing, the CPU 11 transmits the second acquisition instruction that includes identification information to the printing apparatus 1 that executes printing with respect to the treatment medium (step S32). The CPU 11 executes the processing in steps S35 to S39 and step S43 in the same way as the fourth main processing. If it is determined that the non-execution instruction is included in the identification information in the processing in step S39 (yes at step S39), the CPU 11 displays that pretreatment will not be executed on the display 23 (step S42). The CPU 11 then returns the processing to step S31.

Acquisition Processing

Figure 16:
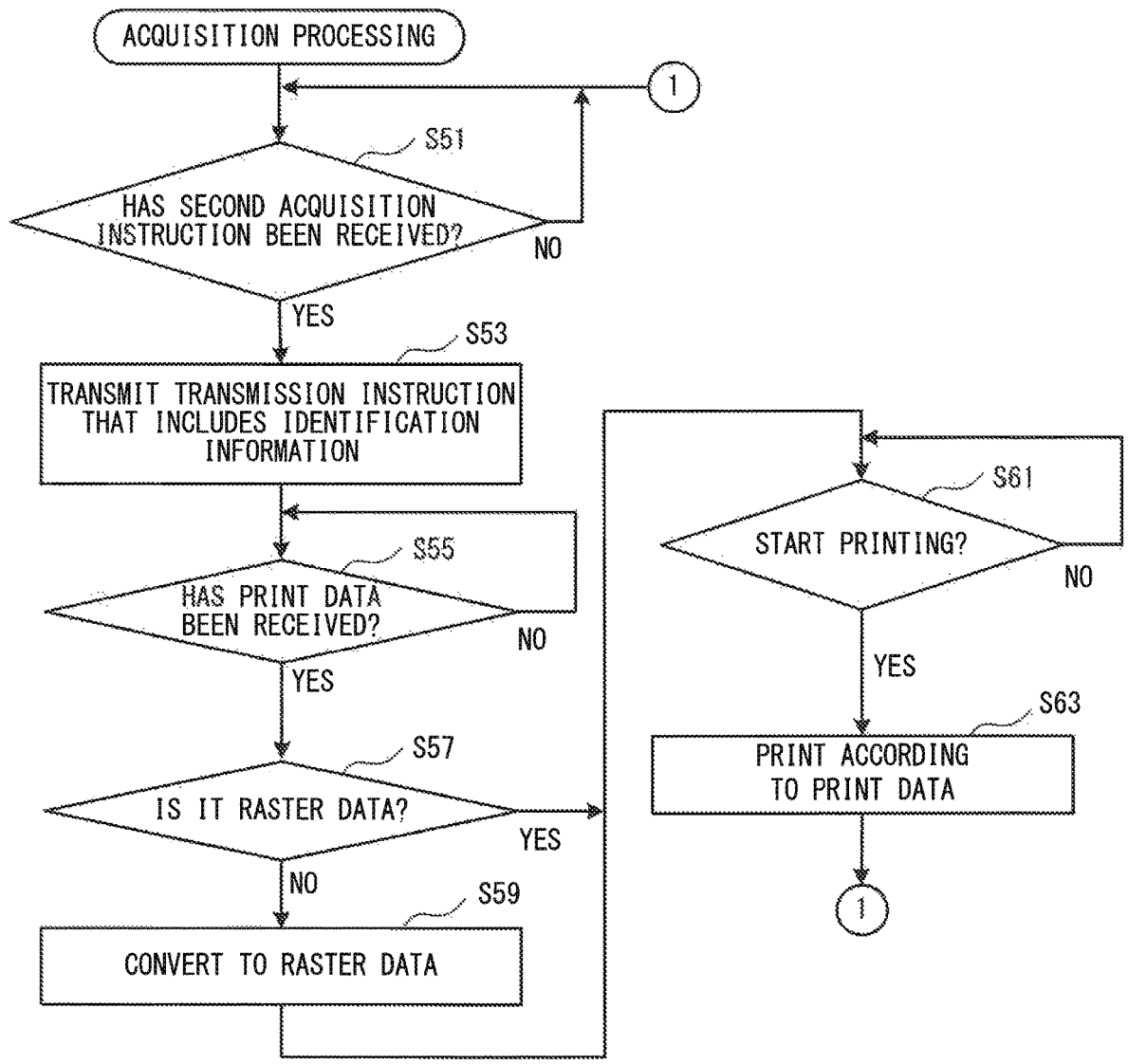
FIG. 16 is a flowchart of acquisition processing.

The flow of acquisition processing will now be described with reference to FIG. 16. The CPU 31 of the printing apparatus 1 reads an acquisition processing program from the ROM 32, and executes the acquisition processing using the RAM 33 as working memory. The start of the acquisition processing is triggered by the power supply of the printing apparatus 1 being turned on, for example.

The CPU 31 determines whether the second acquisition instruction has been received (step S51). For example, when the second acquisition instruction has been received, the communication portion 39 inputs the received second acquisition instruction to the CPU 31. The CPU 31 determines whether the second acquisition instruction has been received by determining whether the second acquisition instruction has been input. If it has been determined that the second acquisition instruction has not been received (no at step S51), the CPU 31 repeats the processing in step S51.

If it is determined that the second acquisition instruction has been received (yes at step S51), the CPU 31 transmits a transmission instruction that includes an identification information to the server 3 that has the HDD 64 that stores the print data (step S53). The processing in step S53 is the same as the processing in step S3 in the first main processing. Therefore, the description of the processing executed by the server 3 that has received the transmission instruction will be omitted. The CPU 31 transmits the transmission instruction instructing the print data to be transmitted, to the server 3 in the processing in step S53, so the CPU 31 determines whether the print data has been received from the server 3 (step S55). The processing in step S55 is the same processing as the processing in step S15 in the first main processing, so a description thereof will be omitted. If it is determined that the print data has not been received (no at step S55), the CPU 31 repeats the processing in step S55.

If it is determined that the print data has been received (yes at step S55), the CPU 31 determines whether the received print data is raster data (step S57). The processing in step S57 is the same processing as the processing in step S17 in the first main processing, so a description thereof will be omitted. If it is determined that the print data is raster data (yes at step S57), the CPU 31 advances the processing to step S61. If it is determined that the print data is not raster data (no at step S57), the CPU 31 converts the print data to raster data based on a known conversion method (step S59).

The CPU 31 determines whether there is an instruction to start printing (step S61). The processing in step S61 is processing that is the same as the processing in step S21 in the first main processing, so a description thereof will be omitted. If it is determined that there is no instruction to start printing (no at step S61), the CPU 31 repeats the processing in step S61. If it is determined that there is an instruction to start printing (yes at step S61), the CPU 31 controls the drive circuits 41 to 44 to execute printing on the treatment medium in accordance with the print data (step S63). The CPU 31 then returns the processing to step S51.

Main Operation and Effects of Fifth Embodiment

According to the fifth embodiment described above, the pretreatment device 10 functions as the pretreatment control apparatus and acquires the identification information of the treatment medium with the code reader 21. The pretreatment device 10 references the first table 81 held in the pretreatment device 10 and acquires a pretreatment instruction corresponding to the acquired identification information. The pretreatment device 10 transmits the second acquisition instruction that includes the acquired identification information to the printing apparatus 1 that executes printing with respect to the treatment medium. As a result, the pretreatment device 10 can acquire the pretreatment instruction and transmit the print data from the server 3 having the HDD 64 that stores the print data, by acquiring a single piece of identification information. Therefore, the number of processing steps by the pretreatment device 10 is fewer than when acquiring the pretreatment instruction and transmitting print data from the server 3 by acquiring different information.

According to the fifth embodiment described above, the pretreatment device 10 transmits the second acquisition instruction that includes the acquired identification information to the printing apparatus 1 that executes printing with respect to the treatment medium, before acquiring the pretreatment instruction. That is, the pretreatment device 10 transmits the second acquisition instruction to the printing apparatus 1 that executes printing with respect to the treatment medium, before finishing the pretreatment with respect to the treatment medium. As a result, the printing apparatus 1 is more likely to finish acquiring the print data by the time the pretreatment by the pretreatment device 10 is complete. Therefore, it is less likely that there will be waiting time until the start of the printing processing after pretreatment is complete.

According to the fifth embodiment described above, when a non-execution instruction is included in the identification information, the pretreatment device 10 displays that pretreatment is not to be executed, on the display 23. As a result, the pretreatment device 10 can reduce the likelihood that the treatment medium will end up being set even though pretreatment will not be executed.

According to the fifth embodiment described above, when the non-execution instruction is included in the identification information, the pretreatment device 10 will not execute pretreatment with respect to the treatment medium. As a result, the pretreatment device 10 can determine whether to execute pretreatment with respect to the treatment medium according to whether the non-execution instruction is included in the identification information. Therefore, the pretreatment device 10 can reduce the likelihood of human error such as executing pretreatment with respect to a treatment medium that does not need to be pretreated.

Sixth Embodiment

The pretreatment control apparatus according to a sixth embodiment is the terminal device 2. The storage device that stores the print data of the sixth embodiment is the HDD 64 of the server 3. The terminal device 2 acquires identification information of the treatment medium via a code reader 60. The terminal device 2 acquires a pretreatment instruction based on the identification information from the first table 81 held in the terminal device 2, and transmits a transmission instruction that includes the identification information to the server 3 having the HDD 64 that stores the print data. The terminal device 2 transmits the acquired pretreatment instruction to the pretreatment device 10 that executes pretreatment with respect to the treatment medium. That is, the terminal device 2 transmits a pretreatment instruction acquired based on the identification information, so the terminal device 2 transmits the pretreatment instruction based on the identification information to the pretreatment device 10 that executes pretreatment with respect to the treatment medium.

Figure 17:
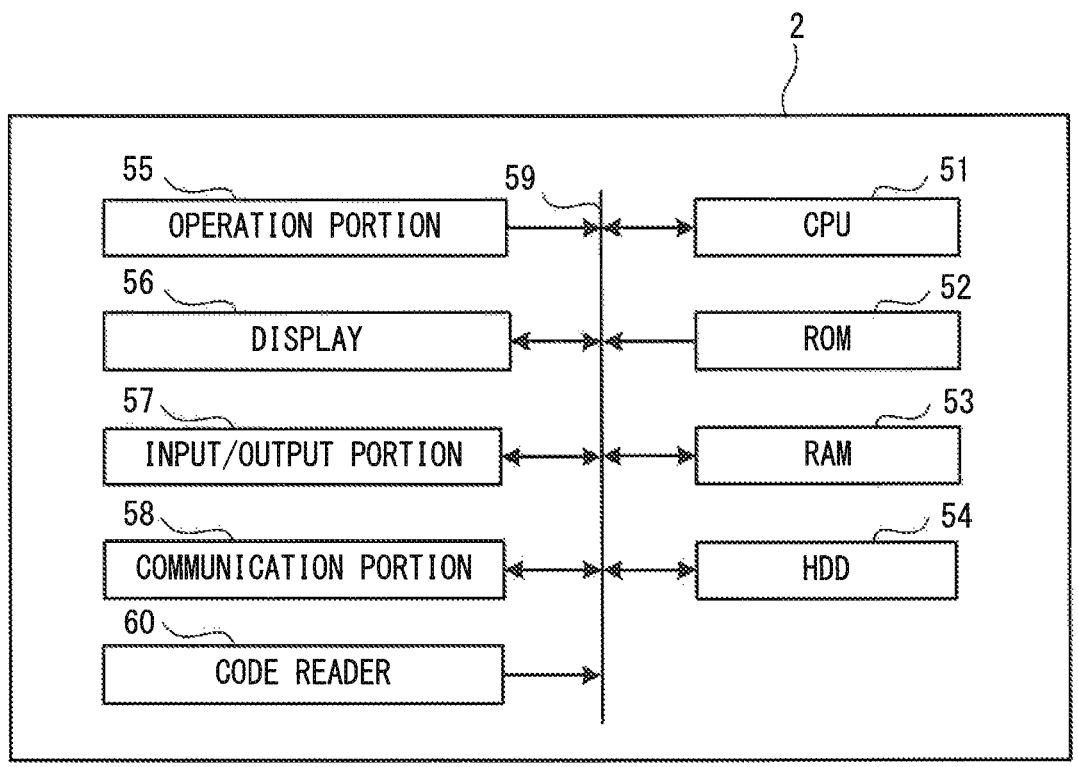
FIG. 17 is a block diagram showing a second example of the general electrical configuration of the terminal device 2.

The electrical configuration of each of the server 3 and the pretreatment device 10 is the same as it is in the first embodiment, so a description thereof will be omitted. However, as shown in FIG. 17, instead of the printing apparatus 1 having the code reader 35, the terminal device 2 is provided with the code reader 60. The other electrical configuration of the printing apparatus 1 and the terminal device 2 is the same as it is in the first embodiment, so a description thereof will be omitted. Also, the first table 81 is stored in the storage device 54 of the terminal device 2.

Sixth Main Processing

Figure 18:
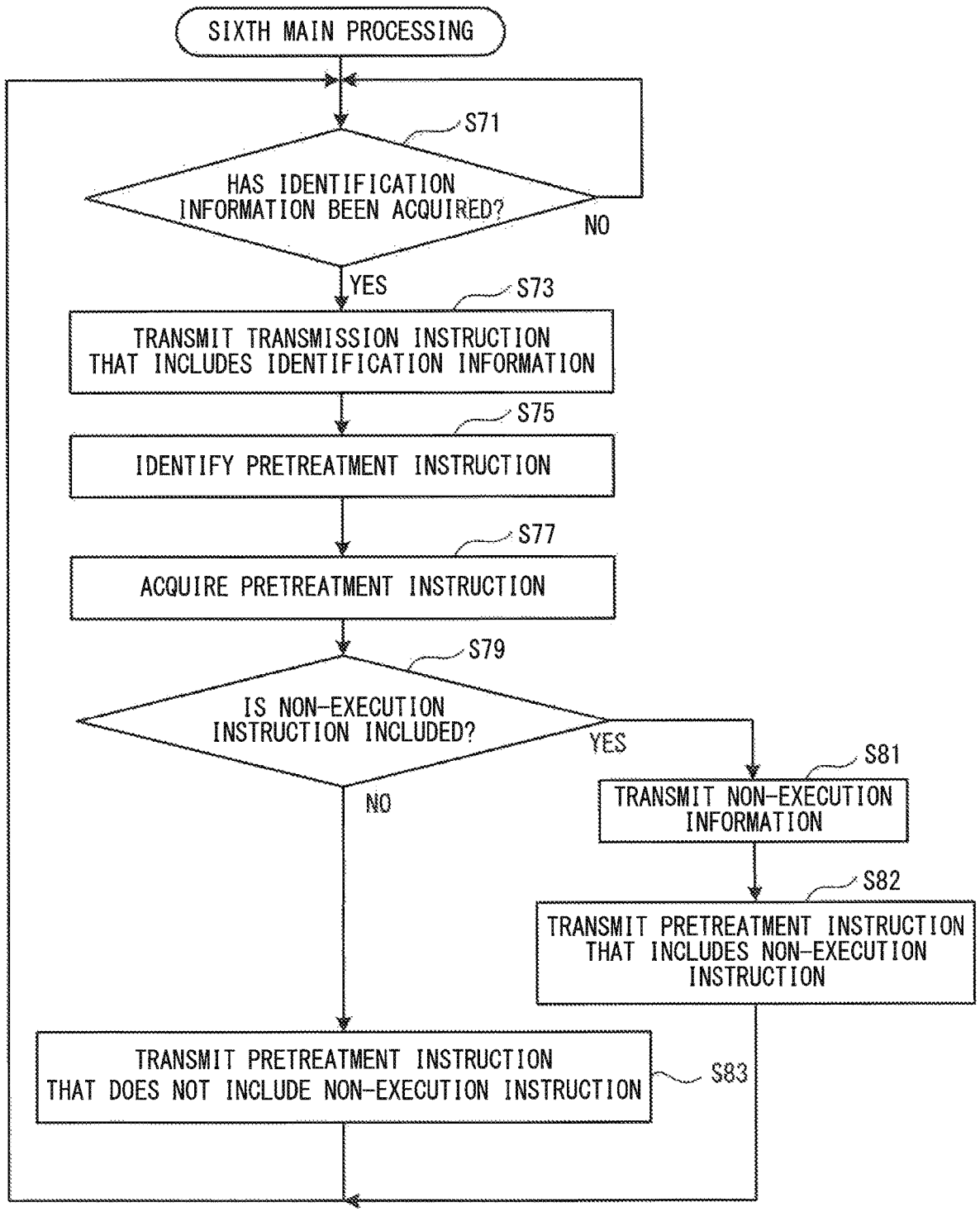
FIG. 18 is a flowchart of a sixth main processing.

The flow of a sixth main processing will now be described with reference to FIG. 18. The CPU 51 of the terminal device 2 reads a sixth main processing program from the storage device 54, and executes the sixth main processing using the RAM 53 as working memory. The start of the sixth main processing is triggered by the power supply of the terminal device 2 being turned on, for example.

The CPU 51 determines whether identification information has been acquired (step S71). More specifically, the CPU 51 determines whether identification information has been acquired by determining whether identification information of a treatment medium read by the code reader 60 has been input to the CPU 51. If it is determined that identification information has not been acquired (no at step S71), the CPU 51 repeats the processing in step S71.

If it is determined that identification information has been acquired (yes at step S71), the CPU 51 transmits, via the communication portion 58, a transmission instruction that includes the acquired identification information to the server 3 that includes the HDD 64 that stores the print data, for example (step S73). The processing in step S73 is the same as the processing in step S3 in the first main processing. Therefore, a description of processing executed by the server 3 that has received the transmission instruction will be omitted. The CPU 51 identifies the pretreatment instruction based on the acquired identification information (step S75). More specifically, the CPU 51 traces the identification information column in the first table 81 held in the terminal device 2 and identifies the identification information that matches the acquired identification information. The CPU 51 identifies the pretreatment instruction corresponding to the identification information identified in the first table 81.

The CPU 51 acquires the identified pretreatment instruction from the first table 81 (step S77). The CPU 51 determines whether the acquired identification information includes a non-execution instruction (step S79). If it is determined that the acquired identification information includes the non-execution instruction (yes at step S79), the CPU 51 transmits, via the communication portion 58, non-execution information to the printing apparatus 1 or the pretreatment device 10 connected via the network 4, for example (step S81). The printing apparatus 1 or the pretreatment device 10 that has received the non-execution information displays that the pretreatment is not to be executed, on the display. The CPU 51 transmits a pretreatment instruction that includes the non-execution instruction to the pretreatment device 10 that executes pretreatment with respect to the treatment medium (step S82). The pretreatment device 10 that has received the pretreatment instruction that includes the non-execution instruction will not execute pretreatment. The CPU 51 then advances the processing to step S71.

If it is determined that the acquired identification information does not include the non-execution instruction (no at step S79), the CPU 51 transmits, via the communication portion 58, a pretreatment instruction that does not include a non-execution instruction to the pretreatment device 10 that executes pretreatment with respect to the treatment medium, for example (step S83). The CPU 51 then returns the processing to step S71.

Main Operation and Effects of Sixth Embodiment

According to the sixth embodiment described above, the terminal device 2 functions as the pretreatment control apparatus and acquires the identification information of the treatment medium with the code reader 60. The terminal device 2 references the first table 81 and acquires a pretreatment instruction corresponding to the acquired identification information. The terminal device 2 transmits a transmission instruction instructing print data corresponding to the acquired identification information to be transmitted, to the server 3, and transmits a pretreatment instruction based on the identification information to the pretreatment device 10 that executes pretreatment with respect to the treatment medium. As a result, the terminal device 2 can transmit the pretreatment instruction and transmit the print data from the server 3, by acquiring a single piece of identification information. Therefore, the number of processing steps by the terminal device 2 is fewer than when transmitting the pretreatment instruction and transmitting print data from the server 3 by acquiring different information.

According to the sixth embodiment described above, the terminal device 2 transmits the transmission instruction instructing print data corresponding to the acquired identification information to be transmitted, to the server 3, before transmitting the pretreatment instruction to the pretreatment device 10 (step S73). That is, the terminal device 2 transmits the transmission instruction to the server 3 before the pretreatment device 10 finishes the pretreatment with respect to the treatment medium. As a result, the printing apparatus 1 is more likely to finish acquiring the print data by the time the pretreatment by the pretreatment device 10 is complete. Therefore, it is less likely that there will be waiting time until the start of the printing processing after pretreatment is complete.

According to the sixth embodiment described above, when a non-execution instruction is included in the acquired identification information, the terminal device 2 transmits a pretreatment instruction that includes the non-execution instruction to the pretreatment device 10 that executes pretreatment with respect to the treatment medium. As a result, the terminal device 2 can notify the pretreatment device 10 as to whether to execute pretreatment.

According to the sixth embodiment described above, when the non-execution instruction is included in the identification information, the terminal device 2 transmits non-execution information to the printing apparatus 1 or the pretreatment device 10, and displays that pretreatment is not to be executed, on the display. As a result, the terminal device 2 can reduce the likelihood that the treatment medium will end up being set on the pretreatment device 10 even though pretreatment will not be executed.

MODIFIED EXAMPLES

In the fourth embodiment to the sixth embodiment described above, the pretreatment device 10 or the terminal device 2 that functions as the pretreatment control apparatus does not have to hold the first table 81. In this case, the pretreatment device 10 or the terminal device 2 that functions as the pretreatment control apparatus may acquire the pretreatment instruction by transmitting the pretreatment instruction request to the server 3 that holds the first table 81 or the like.

In the sixth embodiment described above, the terminal device 2 may transmit the first acquisition instruction to the pretreatment device 10 that executes pretreatment with respect to the treatment medium. The pretreatment device 10 may acquire the pretreatment instruction from any one of the printing apparatus 1, the terminal device 2, and the server 3 that holds the first table 81.

In the fourth embodiment and the sixth embodiment described above, the pretreatment device 10 or the terminal device 2 that functions as the pretreatment control apparatus, may transmit the second acquisition instruction to the printing apparatus 1 that executes printing with respect to the treatment medium. The printing apparatus 1 may acquire the print data from the server 3.

In the first embodiment, the second embodiment, the fourth embodiment, and the sixth embodiment described above, the printing apparatus 1, the pretreatment device 10, or the terminal device 2 that functions as the pretreatment control apparatus may display that pretreatment will not be executed, on a display provided each of the devices, when a non-execution instruction is included in the identification information.

In the first embodiment to the sixth embodiment described above, any one of the printing apparatus 1, the terminal device 2, and the pretreatment device 10 may hold the third table 83. That is, a storage device of any one of the printing apparatus 1, the terminal device 2, and the pretreatment device 10 may store the print data. In this case, the pretreatment control apparatus need only send a transmission instruction to any one of the printing apparatus 1, the terminal device 2, and the pretreatment device 10 that stores the print data.

The printing apparatus 1, the terminal device 2, or the pretreatment device 10 that functions as a pretreatment control apparatus may cause the pretreatment device 10 that executes pretreatment with respect to the treatment medium to transmit the pretreatment instruction from the apparatus holding the pretreatment instruction, when an apparatus aside from the printing apparatus 1, the terminal device 2, and the pretreatment device 10 holds the first table 81. In this case, the printing apparatus 1, the terminal device 2, or the pretreatment device 10 that functions as the pretreatment control apparatus need simply transmit a second transmission instruction to the apparatus that holds the pretreatment instruction. The second transmission instruction is information including the identification information and instructing the pretreatment instruction corresponding to the identification information to be transmitted.

Figure 19:
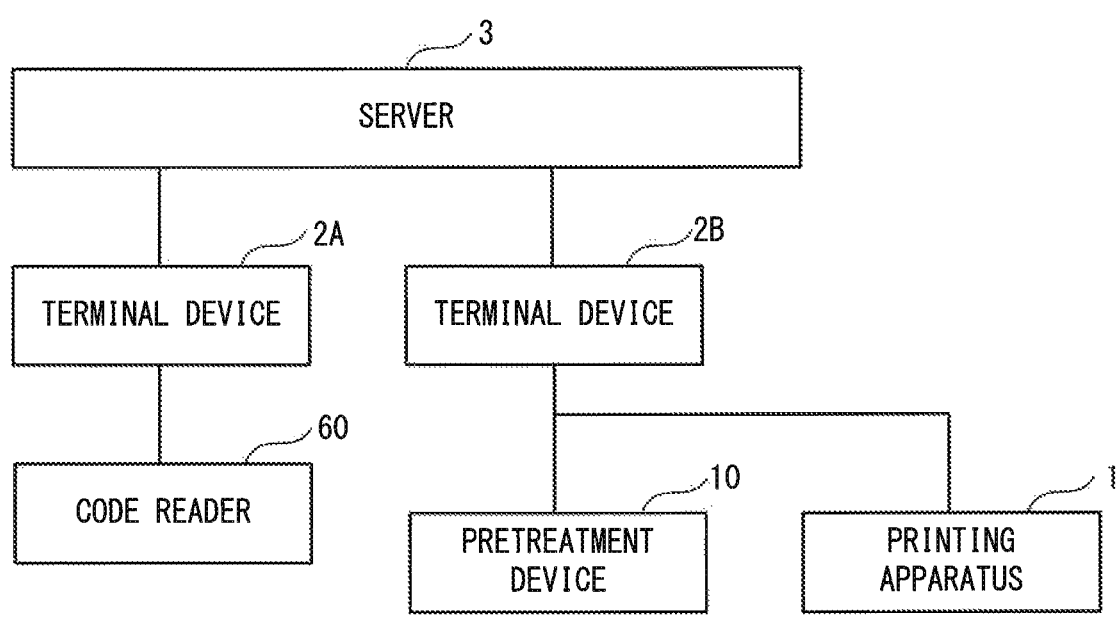
FIG. 19 is a view showing an example of a configuration in which a pretreatment control apparatus is not provided with a code reader.

In the first embodiment to the sixth embodiment described above, the printing apparatus 1, the terminal device 2, or the pretreatment device 10 that functions as the pretreatment control apparatus includes the code readers 35, 60, and 21, respectively. However, the pretreatment control apparatus need not be provided with a code reader. FIG. 19 is a view showing an example in which a terminal device 2A, instead of a terminal device 2B that functions as the pretreatment control apparatus, is provided with the code reader 60. The terminal device 2A acquires the identification information of the treatment medium with the code reader 60, and transmits the acquired identification information to the terminal device 2B that functions the pretreatment control apparatus, via the network 4 or a serial cable. That is, the terminal device 2B that functions as the pretreatment control apparatus acquires the identification information from the terminal device 2A. The pretreatment control apparatus not provided with a code reader may be the printing apparatus 1 or the pretreatment device 10. Also, a device provided with the code reader and that does not function as the pretreatment control apparatus may be the printing apparatus 1 or the pretreatment device 10.

The pretreatment control apparatus may transmit the pretreatment instruction to the pretreatment device 10 that executes pretreatment with respect to the treatment medium, before transmitting the transmission instruction to the server 3. Also, the pretreatment control apparatus may transmit the first acquisition instruction to the pretreatment device 10 that executes pretreatment with respect to the treatment medium, before transmitting the transmission instruction to the server 3. Further, the pretreatment control apparatus may transmit, to an apparatus holding the pretreatment instruction, a request to transmit the pretreatment instruction corresponding to the identification information to the pretreatment device 10 that executes pretreatment with respect to the treatment medium, before transmitting the transmission instruction to the server 3.

Programs and the like for executing main processing and the like may be stored in a disc device or the like of a server device on the Internet, and the printing apparatus 1, the terminal device 2, and the pretreatment device 10 may download various programs, or the like.

According to an embodiment or a modified example, the printing apparatus 1, the terminal device 2, the pretreatment device 10, and the server 3 may have another type of storage device other than ROM and RAM. For example, the printing apparatus 1, the terminal device 2, the pretreatment device 10, and the server 3 may have a storage device such as Content Addressable Memory (CAM), SRAM, and SDRAM.

According to an embodiment or a modified example, the electrical configurations of the printing apparatus 1, the terminal device 2, the pretreatment device 10, and the server 3 may differ from those of FIG. 2 and the like, and other hardware of another standard or type than that exemplified in FIG. 2 and the like can be applied to the printing apparatus 1, the terminal device 2, the pretreatment device 10, and the server 3.

For example, control portions of the printing apparatus 1, the terminal device 2, the pretreatment device 10, and the server 3 shown in FIG. 2 and the like may be formed by a hardware circuit. More specifically, the control portion may be formed by a reconfigurable circuit such as an FPGA, or by an ASIC, instead of at least one of the CPUs such as the CPU 11 and the like. The control portion may also be formed by both the CPU 11 and the like and the hardware circuit. The transmission instruction which is instructing the transmission of the print data corresponding to the identification information may be transmitted to one of the printing apparatus 1, the terminal apparatus 2, the pretreatment device 10, and the server 3, which stores the print data, via the relay server (not illustrated in the drawings).

In the first to the third embodiments, the processing (step S1) for acquiring the identification information of the treatment medium is performed as follows. When the code reader 35 of the printing apparatus 1 reads the identification information such as a bar code attached to the treatment medium, the identification information is input to the CPU 31 of the printing apparatus 1 and acquired. The CPU 31 stores the identification information in the RAM 33. Further, the identification information may be input to the CPU 31 from the operation portion 36, the input/output portion 38, or the communication portion 39 and acquired. The CPU 31 that executes the processing of step S1 is an example of the "acquisition portion" of the present invention.

In the fourth and the fifth embodiments, the processing (step 31) for acquiring identification information of the processing medium is performed as follows.
When the code reader 25 of the pretreatment device 10 reads the identification information such as a bar code attached to the treatment medium, the identification information is input to the CPU 11 of the pretreatment device 10 and acquired. The CPU 11 stores the identification information in the RAM 13. Further, the identification information may be input to the CPU 11 from the operation portion 22, the input/output portion 24, or the communication portion 25 and acquired. The CPU 11 that executes the processing of step S31 is an example of the "acquisition portion" of the present invention.

In the sixth embodiment, the processing (step S71) for acquiring identification information of the processing medium is performed as follows. When the code reader 60 of the terminal device 2 reads the identification information such as a bar code attached to the treatment medium, the identification information is input to the CPU 51 of the terminal device 2 and acquired. The CPU 51 stores the identification information in the RAM 53. Further, the identification information may be input to the CPU 51 from the operation portion 55, the input/output portion 57, or the communication portion 58 and acquired. The CPU 51 that executes the processing of step S71 is an example of the "acquisition portion" of the present invention.

The flash memory 14, the storage device 34, the storage device 54, and the HDD 64 are examples of the "storage device" of the present invention. The print data corresponding to the identification information is an example of the "identified print data" of the present invention. The pretreatment device 10 is an example of the "pretreatment portion" of the present invention. The CPUs 11, 31, and 51 are examples of the "display controlling means" of the present invention. The non-execution instruction is an example of the "information indicating whether to execute pretreatment." The CPUs 11, 31, and 51 are examples of the "computer" of the present invention.

In the first to the third embodiments, the CPU 31 that executes the processing of steps S12 and S13 (the processing of transmitting the pretreatment instruction based on the identification information to the pretreatment device 10) is an example of the "first transmission portion" of the present invention. In the sixth embodiment, the CPU 51 that executes the processing of steps S82 and S83 (the processing of transmitting the pretreatment instruction based on the identification information to the pretreatment device 10) is an example of the "first transmission portion" of the present invention.

In the first to the third embodiments, the CPU 31 that executes the processing of step S3 (the processing of transmitting the instruction to transmit specific print data based on the identification information to the flash memory 14, the storage device 34, the storage device 54, and the HDD 64 that store the print data) is an example of the "second transmission portion" of the present invention. In the fourth embodiment, the CPU 11 that executes processing of step S33 (the processing of transmitting the instruction to transmit specific print data based on the identification information to the flash memory 14, the storage device 34, the storage device 54, and the HDD 64 that store print data) is an example of the "second transmission unit" of the present invention. In the fifth embodiment, the CPU 31 that executes processing of step S53 (the processing of transmitting the instruction to transmit specific print data based on the identification information to the flash memory 14, the storage device 34, the storage device 54, and the HDD 64 that store print data) is an example of the "second transmission unit" of the present invention. In the sixth embodiment, the CPU 51 that executes processing of step S73 (the processing of transmitting the instruction to transmit specific print data based on the identification information to the flash memory 14, the storage device 34, the storage device 54, and the HDD 64 that store print data) is an example of the "second transmission unit" of the present invention.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:
1. A pretreatment control apparatus comprising:
a processor; and
a memory storing computer-readable instructions for execution by the processor to perform a process including:
performing read processing that reads identification information identifying a treatment medium by a reader; and
performing, after the read processing, first transmission processing and second transmission processing in either order, wherein
the first transmission processing transmits a pretreatment instruction based on the identification information read in the read processing to a pretreatment portion which performs a pretreatment with respect to the treatment medium; and the second transmission processing transmits, in response to reading of the identification information prior to the pretreatment, a transmission instruction for identified print data based on the identification information read in the read processing prior to the pretreatment, to a storage which stores print data.

2. The pretreatment control apparatus according to claim 1, wherein in the second transmission processing, the processor transmits the transmission instruction before the pretreatment portion completed.

3. The pretreatment control apparatus according to claim 1, the memory storing computer-readable instructions for execution by the processor to perform a process further including:

performing acquisition processing that acquires the identification information of the treatment medium; wherein in the acquisition processing, the processor acquires the identification information which includes information indicating whether to execute the pretreatment, and when the pretreatment will not be executed based on the identification information which includes the information indicating whether to execute the pretreatment, in the first transmission processing, the processor transmits the pretreatment instruction indicating that the pretreatment is not to be executed.

4. The pretreatment control apparatus according to claim 3, further comprising:

a display controller configured to cause a display to display that the pretreatment is not to be executed, when the pretreatment will not be executed.

5. The pretreatment control apparatus according to claim 1, wherein the pretreatment control apparatus is a printing apparatus which performs printing with respect to the treatment medium.

6. A pretreatment control method having the following steps comprising:

performing read processing that reads identification information identifying a treatment medium by a reader; and performing, after the read processing, first transmission processing and second transmission processing in either order, wherein the first transmission processing transmits a pretreatment instruction based on the identification information read in the read processing to a pretreatment portion which performs a pretreatment with respect to the treatment medium; and the second transmission processing transmits, in response to reading of the identification information prior to the pretreatment, a transmission instruction for identified print data based on the identification information read in the read processing prior to the pretreatment to a storage device which stores the print data.

7. A non-transitory computer-readable medium storing computer-readable instructions which, when executed by a computer of a pretreatment control apparatus, cause the computer to perform steps comprising:

performing read processing that reads identification information identifying a treatment medium by a reader; and performing, after the read processing, first transmission processing and second transmission processing in either order, wherein the first transmission processing transmits a pretreatment instruction based on the identification information read in the read processing to a pretreatment portion which performs a pretreatment with respect to the treatment medium; and the second transmission processing transmits, in response to reading of the identification information prior to the pretreatment, a transmission instruction for identified print data based on the identification information read in the read processing prior to the pretreatment to a storage device which stores the print data.

\* \* \* \* \*